US006708186B1

(12) United States Patent
Claborn et al.

(10) Patent No.: US 6,708,186 B1
(45) Date of Patent: Mar. 16, 2004

(54) AGGREGATING AND MANIPULATING DICTIONARY METADATA IN A DATABASE SYSTEM

(75) Inventors: George H. Claborn, Amherst, NH (US); Lee B. Barton, Winchester, MA (US)

(73) Assignee: Oracle International Corporation, Redwood Shores, CA (US)

( * ) Notice: Subject to any disclaimer, the term of this patent is extended or adjusted under 35 U.S.C. 154(b) by 419 days.

(21) Appl. No.: 09/672,914

(22) Filed: Sep. 28, 2000

Related U.S. Application Data

(60) Provisional application No. 60/225,229, filed on Aug. 14, 2000.

(51) Int. Cl.$^7$ .............................................. G06F 17/30
(52) U.S. Cl. ............................................. 707/107; 707/6
(58) Field of Search ............................... 707/1, 2, 3, 6, 707/10, 102, 103 R; 705/30

(56) References Cited

U.S. PATENT DOCUMENTS

| | | | |
|---|---|---|---|
| 6,122,636 A | * | 9/2000 | Malloy et al. ............... 707/102 |
| 6,205,447 B1 | * | 3/2001 | Malloy ........................ 707/102 |
| 6,327,587 B1 | * | 12/2001 | Forster ........................... 707/2 |
| 6,408,292 B1 | * | 6/2002 | Bakalash et al. ............... 707/2 |
| 6,411,961 B1 | * | 6/2002 | Chen ........................... 707/102 |

* cited by examiner

*Primary Examiner*—Diane D. Mizrahi
(74) *Attorney, Agent, or Firm*—Gordon E. Nelson

(57) ABSTRACT

Techniques for simplifying the aggregation of data stored in a number of objects in a database system. A user-defined type and an object view are associated with a kind of data to be aggregated. The object view specifies the locations of the data in the objects and maps the data to be aggregated into the user-defined type. An application program interface includes a fetch interface that causes the database system to make a query over the object view associated with the kind of data and return the aggregated data in a set of objects of the user-defined type. The returned data is converted to XML and may be further transformed using XSL stylesheets. The application program interface further includes a filter interface that specifies a restriction for the query, a count interface that specifies the number of objects to be returned at once by the application program interface, a transform interface that specifies an XSL style sheet, and a transform parameter interface for providing parameters to the XSL style sheet. The techniques may be used to aggregate metadata for various classes of objects from a data dictionary in a database system. In this application, each class of object has a name and a user-defined type and object view are associated with the class name. The fetch interface specifies a class name and the user-defined type and object view associated with the name are used to aggregate the metadata. One of the transforms performed in this application is the transformation of the metadata for an object into creation DDL for the object.

46 Claims, 24 Drawing Sheets

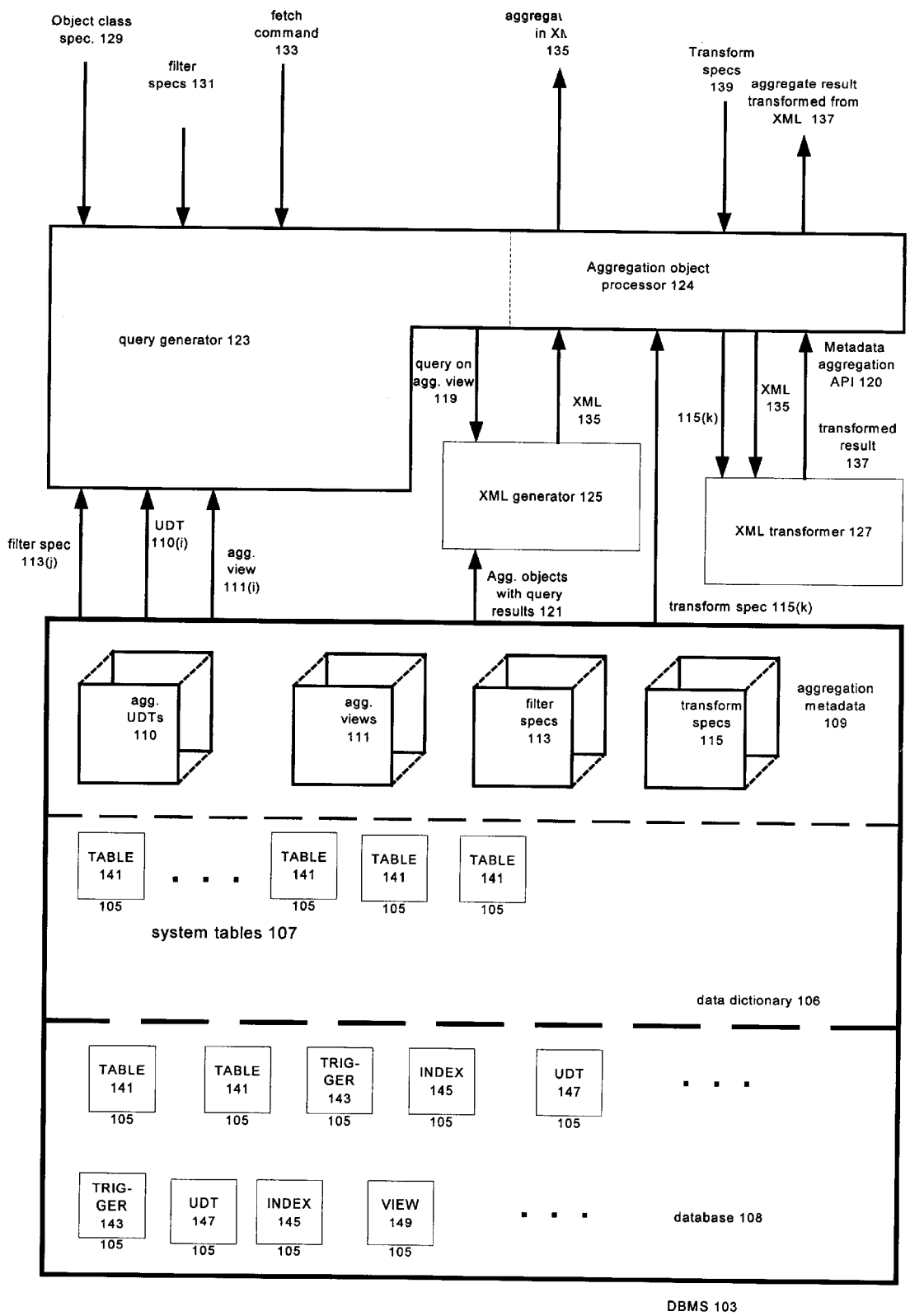
FIG. 1    101

```
-- GET_PAYROLL_TABLES: Fetch DDL for payroll tables and their indexes.

PROCEDURE   get_payroll_tables IS tableOpenHandle     NUMBER;     ⎫
indexOpenHandle     NUMBER;     ⎬ 203
tableTransHandle    NUMBER;     ⎮
indexTransHandle    NUMBER;     ⎭
schemaName          VARCHAR2(30);   ⎫ 205
tableName           VARCHAR2(30);   ⎭
tableDDLs           sys.ku$_ddls;       ⎫
tableDDL            sys.ku$_ddl;        ⎬ 207
parsedItems         sys.ku$_parsed_items; ⎭
indexDDL            CLOB;
                                    209
BEGIN -- open the output file... note that the 1st param. (dir. path) must be   ⎫
-- included in the database's UTL_FILE_DIR init. parameter.                ⎮
--                                                                        ⎮
  BEGIN                                                                   ⎬ 211
    fileHandle := utl_file.fopen('/private/xml', 'ddl.out', 'w', 32760);  ⎮
  EXCEPTION                                                               ⎮
    WHEN OTHERS THEN                                                      ⎮
        RAISE file_not_found;                                             ⎮
  END;                                                                    ⎭

-- Open a handle for tables in the current schema.
   tableOpenHandle := dbms_metadata.open('TABLE');    213

-- Tell mdAPI to retrieve one table at a time. This call is not actually
-- necessary since 1 is the default.
   dbms_metadata.set_count(tableOpenHandle, 1);    215

-- Retrieve tables whose name starts with 'PAYROLL'. When the filter is
-- 'NAME_EXPR', the filter value string must include the SQL operator. This
-- gives the caller flexibility to use LIKE, IN, NOT IN, subqueries, etc.
   dbms_metadata.set_filter(tableOpenHandle, 'NAME_EXPR', 'LIKE ''PAYROLL%''');   217

-- Tell the mdAPI to parse out each table's schema and name separately so we
-- can use them to set up the calls to retrieve its indexes.
   dbms_metadata.set_parse_item(tableOpenHandle, 'SCHEMA');   219
   dbms_metadata.set_parse_item(tableOpenHandle, 'NAME');     221

-- Add the DDL transform so we get SQL creation DDL
   tableTransHandle := dbms_metadata.add_transform(tableOpenHandle, 'DDL'); 223

-- Tell the XSL stylesheet we don't want physical storage information (storage,
-- tablespace, etc), and that we want a SQL terminator on each DDL. Notice that
-- these calls use the transform, not open handle.
   dbms_metadata.set_transform_param(tableTransHandle,               ⎫
                       'SEGMENT_ATTRIBUTES', FALSE);                 ⎬ 225
   dbms_metadata.set_transform_param(tableTransHandle,               ⎮
                       'SQLTERMINATOR', TRUE);                       ⎭
201

FIG. 2A
```

```
-- Ready to start fetching tables. We use the FETCH_DDL interface
(rather than
-- FETCH_XML or FETCH_CLOB). This interface returns a
SYS.KU$_DDLS; a table of
-- SYS.KU$_DDL objects. This is a table because some object types
return
-- multiple DDL statements (like types / pkgs which have create
header and
-- body statements). Each KU$_DDL has a CLOB containing the
'CREATE foo'
-- statement plus a nested table of the parse items specified. In
our case,
-- we asked for two parse items; Schema and Name.
   LOOP
      tableDDLs := dbms_metadata.fetch_ddl(tableOpenHandle);      229
      EXIT WHEN tableDDLs IS NULL;    -- Get out when no more     231
payroll tables -- In our case, we know there is only one row in tableDDLs (a
KU$_DDLS tbl obj)
-- for the current table. Sometimes tables have multiple DDL
statements;
-- eg, if constraints are applied as ALTER TABLE statements, but
we didn't ask
-- for that option. So, rather than writing code to loop through
tableDDLs, we'll
-- just work with the 1st row. First, write the CREATE TABLE text
to our
-- output file and retrieve the parsed schema and table names.
      tableDDL := tableDDLs(1);
      write_lob(tableDDL.ddltext);                                233
      parsedItems := tableDDL.parsedItems;

-- Must check the name of the returned parse items as ordering
isn't guaranteed
      FOR i IN 1..2 LOOP
         IF parsedItems(i).item = 'SCHEMA'
         THEN
            schemaName := parsedItems(i).value;                   235
         ELSE
            tableName  := parsedItems(i).value;
         END IF;
      END LOOP;
         201
```

FIG. 2B

```
-- Then use the schema and table names to set up a 2nd stream
for retrieval of
-- the current table's indexes
    indexOpenHandle := dbms_metadata.open('INDEX');      239 dbms_metadata.set_filter(indexOpenHandle,'BASE_OBJECT_SCHEMA',   241
schemaName);

dbms_metadata.set_filter(indexOpenHandle,'BASE_OBJECT_NAME',ta   243
bleName);

-- Add the DDL transform and set the same transform options we
did for tables
    indexTransHandle :=                                  245
dbms_metadata.add_transform(indexOpenHandle, 'DDL');
    dbms_metadata.set_transform_param(indexTransHandle,  247
                       'SEGMENT_ATTRIBUTES', FALSE);
    dbms_metadata.set_transform_param(indexTransHandle,  249
                       'SQLTERMINATOR', TRUE);

-- Retrieve index DDLs as CLOBs and write them to the output
file.
    LOOP
       indexDDL := dbms_metadata.fetch_clob(indexOpenHandle);
       EXIT WHEN indexDDL IS NULL;                       251
       write_lob(indexDDL);
    END LOOP;

-- Free resources allocated for index stream.
    dbms_metadata.close(indexOpenHandle);

END LOOP;

-- Free resources allocated for table stream and close output
file.
    dbms_metadata.close(tableOpenHandle);
    utl_file.fclose(fileHandle);                         253
    RETURN;

END;   -- of procedure get_payroll_tables
```

| Type name | Meaning | Schema Object? | Notes |
|---|---|---|---|
| FUNCTION | stored functions | | |
| INDEX | indexes | | |
| INDEXTYPE | indextypes | | |
| OBJECT_GRANT | object grants | | Not a named object. |
| OPERATOR | operators | | |
| OUTLINE | stored outlines | N | |
| PACKAGE | stored packages | | By default, both package specification and package body are retrieved. See SET_FILTER, below. |
| PROCEDURE | stored procedures | | |
| SYSTEM_GRANT | system privilege or role grants | N | Not a named object. |
| TABLE | tables | | |
| TABLESPACE | tablespaces | N | |
| TRIGGER | triggers | | |
| TYPE | user-defined types | | By default, both type and type body are retrieved. See SET_FILTER, below. |
| VIEW | views | | |

| Object Type | Name | Datatype | Meaning |
|---|---|---|---|
| Named objects | NAME | text | Objects with this exact name are selected. |
| | NAME_EXPR | text | The filter value is the right-hand side of a SQL comparison, i.e., a SQL comparison operator (=, !=, etc.) and the value compared against. The value must contain parentheses and quotation marks where appropriate. In particular, two single quotes (not a double quote) are needed to represent an apostrophe. E.g.,<br><br>`'IN ( ''DEPT'' , ''EMP'' ) '`<br><br>The filter value is combined with the object attribute corresponding to the object name to produce a WHERE condition in the query that fetches the objects. In the example above, objects named 'DEPT' and 'EMP' are retrieved.<br><br>By default, all named objects of the object_type are selected. |
| Schema objects | SCHEMA | text | Objects in this schema are selected. |
| | SCHEMA_EXPR | text | The filter value is the right-hand side of a SQL comparison. The filter value is combined with the object attribute corresponding to the object's schema to produce a WHERE condition in the query that fetches the objects. See 'NAME_EXPR', above, for syntax details.<br><br>By default, only objects in the current schema are selected. See "Security," below. |
| PACKAGE, TYPE | SPECIFICATION | boolean | If TRUE, retrieve the package or type specification. Defaults to TRUE. |
| | BODY | boolean | If TRUE, retrieve the package or type body. Defaults to TRUE. |
| TABLE | TABLESPACE | text | Tables in this tablespace (or having this as their default tablespace) are selected. |
| | TABLESPACE_EXPR | text | The filter value is the right-hand side of a SQL |

FIG. 4A 401

| | | | |
|---|---|---|---|
| | | | comparison. The filter value is combined with the object attribute corresponding to the object's tablespace or default tablespace to produce a WHERE condition in the query that fetches the objects. See 'NAME_EXPR', above, for syntax details.<br><br>By default, objects in all tablespaces are selected. |
| INDEX, OBJECT_GRANT, TRIGGER | BASE_OBJECT_NAME | text | Indexes, triggers or privileges are selected that are defined/granted on objects with this name.<br>Specify 'SCHEMA' for triggers on schemas.<br>Specify 'DATABASE' for database triggers. |
| | BASE_OBJECT_SCHEMA | text | Indexes, triggers or privileges are selected that are defined/granted on objects in this schema. |
| OBJECT_GRANT, SYSTEM_GRANT | GRANTEE | text | Privileges are selected that are granted to this user or role.<br>Specify 'PUBLIC' for grants to PUBLIC. |
| | GRANTOR | text | Privileges are selected that are granted by this user. |
| All objects | CUSTOM_FILTER | text | The text of a WHERE condition. The condition is appended to the query that fetches the objects.<br>By default, no custom filter is used.<br><br>CUSTOM_FILTER is an escape hatch to be resorted to when the defined filters don't do the job. Of necessity such a filter depends on the detailed structure of the UDTs and views in the query. Since these may change from version to version, upward compatibility is not guaranteed. |

| Object type | Table Type | Filter Data Type | Meaning |
|---|---|---|---|
| TABLE | RELATIONAL | boolean | If TRUE, retrieve relational tables. Defaults to TRUE. |
| | OBJECT | boolean | If TRUE, retrieve object tables. Defaults to TRUE.<br><br>'RELATIONAL' and 'OBJECT' are disjoint sets. A table is either one or the other. If both filters are set to FALSE, no tables will be retrieved. |
| | PARTITIONED | boolean | If TRUE, retrieve partitioned tables. Defaults to TRUE. |
| | NON_PARTITIONED | boolean | If TRUE, retrieve non-partitioned tables. Defaults to TRUE.<br><br>'PARTITIONED' and 'NON_PARTITIONED' are disjoint sets. A table is either one or the other. If both filters are set to FALSE, no tables will be retrieved. |
| | HEAP | boolean | If TRUE, retrieve heap tables. Defaults to TRUE. |
| | IOT | boolean | If TRUE, retrieve index-organized tables. Defaults to TRUE.<br><br>'HEAP' and 'IOT' are disjoint sets. A table is either one or the other. If both filters are set to FALSE, no tables will be retrieved. |
| | LOB_COL | boolean | If TRUE, retrieve tables with LOB columns. Defaults to TRUE. |

| Object type | Table Type | Filter Data Type | Meaning |
|---|---|---|---|
| TABLE | UDT_COL | boolean | If TRUE, retrieve tables with UDT columns (types and collections.)<br><br>Defaults to TRUE.<br><br>'LOB_COL' and 'UDT_COL' control the complexity of the per-column data retrieved. If both filters are set to FALSE, only tables containing exclusively columns of built-in, non-LOB datatypes (NUMBER, CHAR, etc.) are retrieved. This often improves retrieval performance. |
| | INCOMPLETE | boolean | If TRUE, retrieve nested tables and overflow segments as separate objects. These are not complete tables; they cannot be created in isolation, but are instead created when a containing table is created. (When the containing table is retrieved, so is the metadata for its nested tables and overflow segments.)<br><br>Defaults to FALSE. |

| Object Type | Name | Meaning |
|---|---|---|
| All objects | VERB | For every row in the sys.ku$_ddls nested table returned by *fetch_ddl* the verb in the corresponding *ddlText* is returned. If *fetch_xml* is called, NULL is returned. |
| | OBJECT_TYPE | The object type as used in a DDL "CREATE" statement is returned, e.g., "TABLE," "PACKAGE BODY," etc. |
| | SCHEMA | The object's schema is returned. If the object is not a schema object, NULL is returned. |
| | NAME | The object's name is returned. If the object is not a named object, NULL is returned. |
| TABLE, INDEX | TABLESPACE | The name of the table's or index's tablespace or default tablespace is returned. |
| TRIGGER | ENABLE | If the trigger is enabled, "ENABLE" is returned. If the trigger is disabled, "DISABLE" is returned. |

| Object Type | Name | Datatype | Meaning |
|---|---|---|---|
| All objects | PRETTY | boolean | If TRUE, format the output with indentation and line feeds.<br><br>Defaults to TRUE. |
| | SQLTERMINATOR | boolean | If TRUE, append a SQL terminator (';' or '/') to each DDL statement.<br><br>Defaults to FALSE. |
| TABLE | SEGMENT_ATTRIBUTES | boolean | If TRUE, emit segment attributes (physical attributes, storage attributes, tablespace, logging). Defaults to TRUE. |
| | STORAGE | boolean | If TRUE, emit storage clause. (Ignored if SEGMENT_ATTRIBUTES is FALSE.)<br><br>Defaults to TRUE. |
| | TABLESPACE | boolean | If TRUE, emit tablespace. (Ignored if SEGMENT_ATTRIBUTES is FALSE.)<br><br>Defaults to TRUE. |
| | CONSTRAINTS | boolean | If TRUE, emit all non-referential table constraints.<br><br>Defaults to TRUE. |
| | REF_CONSTRAINTS | boolean | If TRUE, emit all referential constraints (foreign key and scoped refs).<br><br>Defaults to TRUE. |
| | CONSTRAINTS_AS_ALTER | boolean | If TRUE, emit table constraints as separate ALTER TABLE (and, if necessary, CREATE INDEX) statements. If FALSE, specify table constraints as part of the CREATE TABLE statement.<br><br>Defaults to FALSE. |
| TABLE | OID | boolean | If TRUE, emit the OID clause for object tables.<br><br>Defaults to FALSE. |
| INDEX | SEGMENT_ATTRIBUTES | boolean | If TRUE, emit segment attributes (physical attributes, storage attributes, tablespace, logging).<br><br>Defaults to TRUE. |
| | STORAGE | boolean | If TRUE, emit storage clause. (Ignored if SEGMENT_ATTRIBUTES is FALSE.)<br><br>Defaults to TRUE. |
| | TABLESPACE | boolean | If TRUE, emit tablespace. (Ignored if SEGMENT_ATTRIBUTES is FALSE.)<br><br>Defaults to TRUE. |

FIG. 7A          701

| Object Type | Name | Datatype | Meaning |
|---|---|---|---|
| TYPE | SPECIFICATION | boolean | If TRUE, emit the type specification.<br>Defaults to TRUE. |
| | BODY | boolean | If TRUE, emit the type body.<br>Defaults to TRUE. |
| | OID | boolean | If TRUE, emit the OID clause.<br>Defaults to FALSE. |
| PACKAGE | SPECIFICATION | boolean | If TRUE, emit the package specification.<br>Defaults to TRUE. |
| | BODY | boolean | If TRUE, emit the package body.<br>Defaults to TRUE. |
| VIEW | FORCE | boolean | If TRUE, use the FORCE keyword in the CREATE VIEW statement.<br>Defaults to TRUE. |
| OUTLINE | INSERT | boolean | If TRUE, emit the INSERT statements into the OL$ dictionary tables that will create the outline and its hints. If FALSE, emit a CREATE OUTLINE statment.<br>Defaults to FALSE. |
| All objects | DEFAULT | boolean | Calling SET_TRANSFORM_PARAM with this parameter set to TRUE has the effect of resetting all parameters for the transform to their default values.<br>Setting this FALSE has no effect.<br>There is no default. |
| | INHERIT | boolean | If TRUE, inherit session-level parameters.<br>Defaults to FALSE, i.e., if an application calls ADD_TRANSFORM to add the "DDL" transform, then by default the only transform parameters that apply are those explicitly set for that transform handle.<br>This has no effect if the transform handle is the session transform handle. |

FIG. 7B    701

```
CREATE TYPE sys.ku$_parsed_item AS OBJECT (
                            item            VARCHAR2(30),
                            value           VARCHAR2(4000),        } 803
                            parent          NUMBER );

CREATE TYPE sys.ku$_parsed_items IS TABLE OF sys.ku$_parsed_item;   805

CREATE TYPE sys.ku$_ddl AS OBJECT (
                            ddlText         CLOB,
                            parsedItems                            } 807
                            sys.ku$_parsed_items );

CREATE TYPE sys.ku$_ddls IS TABLE OF sys.ku$_ddl;   809

CREATE TYPE sys.ku$_SubmitError IS OBJECT (
                            statement       CLOB,
                            errorNumber     NUMBER,                } 811
                            errorText       CLOB );

CREATE TYPE sys.ku$_SubmitErrors IS TABLE OF sys.ku$_SubmitError;   813
```

```
create table metaview$         /* metadata UDT/view table */
( type varchar2("M_IDEN") not null,      /* object type */     903
  flags number not null,                 /* object flags */
  properties number not null,            /* object flags */
  model varchar2("M_IDEN") not null,     /* model properties */  905
  version varchar2("M_IDEN"),            /* version */          906
  xmltag varchar2("M_IDEN"),             /* xml tag */          907
  udt   varchar2("M_IDEN") not null,     /* UDT name */         909
  schema varchar2("M_IDEN"),             /* view schema */  ⎫
  viewname varchar2("M_IDEN") not null   /* view name */    ⎬ 911
)                                                          ⎭
901 create table metafilter$ /* maps filters in mdAPI to UDT attributes */
(
  filter varchar2("M_IDEN") not null,     /* documented filter. name */ 915
  type varchar2("M_IDEN") not null,  /* dict. obj type: e.g, 'TABLE' */ 903
  model     varchar2("M_IDEN") not null,          /* model name */      905
  properties number not null,       * filter properties */     ⎫
                                    /* 0x01 = boolean filter,  ⎪
                                    0x02 = expression filter */⎬ 917
                                    /* 0x04 = custom filter,   ⎪
                                    0x08 = has default      */ ⎭
  view_attr number not null,  /* view flag bits (boolean filters only) */
  attrname varchar2(2000),    /* filtering attribute */ 919
  default_val   number
(
913
```

FIG. 9A

```
create table metaxsl$                      /* metadata xsl table */
( xmltag varchar2("M_IDEN") not null,           /* xml tag */     907
  transform varchar2("M_IDEN") not null,/* transform name */     923
  model            varchar2("M_IDEN") not null,    /* model name */  905
  script varchar2(2000) not null       /* URI of xsl script */   925
)
```
921

```
create table metaxslparam$      /*legal parameters for mdAPI's XSL scripts*/
(
  model             varchar2("M_IDEN") not null, /* model name */  929
  transform    varchar2("M_IDEN") not null,   /* transform name */  931
  type         varchar2("M_IDEN") not null,   /* type: e.g, 'TABLE' */ 903
  param        varchar2("M_IDEN") not null,   /* param. name */  933
  default_val  varchar2(2000)
)
```
927

```
create table metastylesheet         /* Storage for XSL stylesheets */
( name          varchar2("M_IDEN") not null,      /* stylesheet name */ 937
  model         varchar2("M_IDEN") not null,         /* model */ 939
  stylesheet    clob                            /* stylesheet body */ 941
)
```
935

FIG. 9B

```
create or replace type ku$_table_t as object
(
    db_version      varchar2(14),       /* database version number */  1002
    major_version   number,             /* UDT major version number */ ⎫
    minor_version   number,             /* UDT minor version number */ ⎬ 1003
    obj_num         number,             /* obj# */  1005                ⎭
    schema_obj      ku$_schemaobj_t,    /* schema object */  1007
    storage         ku$_storage_t,      /* storage */  1009
    ts_name         varchar2(30),       /* tablespace name */ 1011
    dataobj_num     number,             /* data layer object# */
    bobj_num        number,             /* base obj# (cluster/iot) */
    tab_num         number,             /* # in cluster, null if
                                                !clustered */
    cols            number,             /* # of columns */
    clucols         number,             /* # of clustered cols,
                                                if clustered */
    pct_free        number,             /* min. free space %age
                                                in a block */
    pct_used        number,             /* min. used space %age
                                                in a block */
    initrans        number,             /* init number of transaction */
    maxtrans        number,             /* max number of transaction */  ⎬ 1012
    flags           number,             /* flags */
    audit_val       varchar2(38),       /* auditing options */
    rowcnt          number,             /* number of rows */
    blkcnt          number,             /* number of blocks */
    empcnt          number,             /* number of empty blocks */
    avgspc          number,             /* avg available free space */
    chncnt          number,             /* number of chained rows */
    avgrln          number,             /* average row length */
    avgspc_flb      number,             /* avg avail free space of
                                                blocks on free list */
    flbcnt          number,             /* free list block count */
1001
```

FIG. 10A

```
    analyzetime    date,           /* timestamp when last analyzed */
    samplesize     number,            /* number of rows sampled by
                                             Analyze */
    degree         number,         /* # of PQ slaves per instance */
    instances      number,            /* # of OPS instances for PQ */
    intcols        number,            /* # of internal columns */
    kernelcols     number,            /* number of REAL (kernel)
                                             columns */
    property       number,         /* table properties */
    trigflag       number,         /* inline trigger flags */
    spare1         number,         /* used to store hakan_kqldtvc */
    spare2         number,            /* committed partition # used by
                                             drop column */
    spare3         number,         /* summary sequence number */
    spare4         varchar2(1000),  /* committed RID used by drop
                                             column */
    spare5         varchar2(1000),
    spare6         date,           /* dml timestamp */ col_list       ku$_column_list_t,  /* list of columns */   1013
    con_list       ku$_constraint_list_t,  /* list of constraints */  1015
    part_obj       ku$_part_obj_t       /* null if !partitioned */  1017
)
1001
```

```
create or replace force view ku$_table_view of ku$_table_t      ⎫ 1102
    with object OID(obj_num)                                     ⎭ as select
    '08.02.00.00.00', 1, 0,   1104
    t.obj#, value(o), value(s),  1105
        (select ts.name from ku$_tablespace_view ts     ⎫ 1107
            where t.ts# = ts.ts_num),                   ⎭
    t.dataobj#, t.bobj#, t.tab#, t.cols,
    t.clucols, t.pctfree$, t.pctused$, t.initrans, t.maxtrans, t.flags,
    t.audit$, t.rowcnt, t.blkcnt, t.empcnt, t.avgspc, t.chncnt,                  ⎫ 1109
    t.avgrln, t.avgspc_flb, t.flbcnt, t.analyzetime, t.samplesize,
    t.degree, t.instances, t.intcols, t.kernelcols, t.property,
    t.trigflag, t.spare1, t.spare2, t.spare3, t.spare4, t.spare5,
    t.spare6,                                                                     ⎭ cast( multiset(select * from ku$_column_view c       ⎫
        where c.obj_num = t.obj#)                         ⎬ 1111
            as ku$_column_list_t),                         ⎭ cast( multiset(select * from ku$_constraint_view con   ⎫
        where con.obj_num = t.obj#)                         ⎬ 1113
            as ku$_constraint_list_t),                       ⎭

(select value(po) from ku$_part_obj_view po
        where t.obj# = po.obj_num)
from tab$ t, ku$_schemaobj_view o, ku$_storage_view s
    where t.obj# = o.obj_num(+)    1117
        AND    t.file#  = s.file_num(+)   ⎫
        AND    t.block# = s.block_num(+)  ⎬ 1119        ⎫ 1115
1116    AND    t.ts#    = s.ts_num(+)     ⎭
        AND    (UID IN (o.owner_num, 0)
        OR     EXISTS ( SELECT * FROM session_roles   ⎬ 1121
                WHERE role='SELECT_CATALOG_ROLE' ))
                        1101
```

FIG. 11

```
            ⎧  CREATE TABLE "SCOTT"."BONUS" 1205
            ⎪       (    "ENAME" VARCHAR2(10),  1209 ⎫
   1203     ⎨            "JOB" VARCHAR2(9),          ⎪
            ⎪            "SAL" NUMBER,               ⎬ 1207
            ⎪            "COMM" NUMBER               ⎪
            ⎩       )                            ⎭

⎧  PCTFREE 10 PCTUSED 40 INITRANS 1 MAXTRANS 255  1213
            ⎪  STORAGE(INITIAL 10240 NEXT 10240 MINEXTENTS 1 ⎫
   1211     ⎨  MAXEXTENTS 121 PCTINCREASE 50 FREELISTS 1     ⎬ 1215
            ⎪  FREELIST GROUPS 1 BUFFER_POOL DEFAULT)        ⎭
            ⎩  TABLESPACE "SYSTEM";   1217
```

```
<TABLE_T>  1303
                                                        (1002)
<DB_VERSION>08.02.00.00.00</DB_VERSION>
  <MAJOR_VERSION>1</MAJOR_VERSION>  ⎤
                                    ⎬ (1003)
  <MINOR_VERSION>0</MINOR_VERSION>  ⎦
  <OBJ_NUM>2894</OBJ_NUM>    (1005)
  <SCHEMA_OBJ>
    <OBJ_NUM>2894</OBJ_NUM>
    <DATAOBJ_NUM>2894</DATAOBJ_NUM>
    <OWNER_NUM>19</OWNER_NUM>
    <OWNER_NAME>SCOTT</OWNER_NAME>
    <NAME>BONUS</NAME>
    <NAMESPACE>1</NAMESPACE>                    (1007)
    <TYPE_NUM>2</TYPE_NUM>
    <CTIME>1999-05-14 15:56:16.0</CTIME>
    <MTIME>1999-05-14 15:56:16.0</MTIME>
    <STIME>1999-05-14 15:56:16.0</STIME>
    <STATUS>1</STATUS>
    <FLAGS>0</FLAGS>
  </SCHEMA_OBJ>
  <STORAGE>
    <FILE_NUM>1</FILE_NUM>
    <BLOCK_NUM>21345</BLOCK_NUM>
    <TYPE_NUM>5</TYPE_NUM>
    <TS_NUM>0</TS_NUM>
    <BLOCKS>5</BLOCKS>
    <EXTENTS>1</EXTENTS>
    <INIEXTS>5</INIEXTS>
    <MINEXTS>1</MINEXTS>                        (1009)
    <MAXEXTS>121</MAXEXTS>
    <EXTSIZE>5</EXTSIZE>
    <EXTPCT>50</EXTPCT>
    <USER_NUM>19</USER_NUM>
    <LISTS>1</LISTS>
    <GROUPS>1</GROUPS>
    <BITMAPRANGES>0</BITMAPRANGES>
    <CACHEHINT>0</CACHEHINT>
                        1301
```

FIG. 13A

```
<SCANHINT>0</SCANHINT>        ⎫                    . . .
<HWMINCR>0</HWMINCR>          ⎬ (1009)         </COL_LIST>  (1013)
</STORAGE>                    ⎭                 </TABLE_T>   1303
<TS_NAME>SYSTEM</TS_NAME>  (1011)
<DATAOBJ_NUM>2894</DATAOBJ_NUM>   ⎫
<COLS>4</COLS>                     |
<PCT_FREE>10</PCT_FREE>            |
<PCT_USED>40</PCT_USED>            |
<INITRANS>1</INITRANS>             |
<MAXTRANS>255</MAXTRANS>           |
<FLAGS>1</FLAGS>                   |
<AUDIT_VAL>--------------</AUDIT_VAL>  ⎬ (1012)
<INTCOLS>4</INTCOLS>               |
<KERNELCOLS>4</KERNELCOLS>         |
<PROPERTY>0</PROPERTY>             |
<TRIGFLAG>0</TRIGFLAG>             |
<SPARE1>178</SPARE1>               |
<SPARE3>0</SPARE3>                 ⎭
<COL_LIST>  (1013)
  <COL_LIST_ITEM itemNo="1">       ⎫
    <OBJ_NUM>2894</OBJ_NUM>         |
    <COL_NUM>1</COL_NUM>            |
    <SEGCOL_NUM>1</SEGCOL_NUM>      |
    <SEGCOLLENGTH>10</SEGCOLLENGTH> |
    <OFFSET>0</OFFSET>              |
    <NAME>ENAME</NAME>              |
    <TYPE_NUM>1</TYPE_NUM>          |
    <LENGTH>10</LENGTH>             ⎬ 1305 (1013)
    <FIXEDSTORAGE>0</FIXEDSTORAGE>  |
    <IS_NULL>0</IS_NULL>            |
    <INTCOL_NUM>1</INTCOL_NUM>      |
    <PROPERTY>0</PROPERTY>          |
    <CHARSETID>2</CHARSETID>        |
    <CHARSETFORM>1</CHARSETFORM>    |
    <SPARE1>0</SPARE1>              |
    <SPARE2>0</SPARE2>              |
  </COL_LIST_ITEM>  . . .          ⎭
```

```
<xsl:template match="COL_LIST">  1403
    <xsl:text>                            1405
    (</xsl:text>
    <xsl:for-each select="COL_LIST_ITEM">
        <xsl:sort select="COL_NUM"/>  1409
        <xsl:text>   "</xsl:text>  1411
        <xsl:value-of select="NAME"/>  1413
        <xsl:text>" </xsl:text>
        <xsl:if test="$UDT_type='TABLE'">  1415
            <xsl:apply-templates select="TYPE_NUM"/>  1417
        </xsl:if>
        <xsl:choose>
            <!-- Put out a comma / LF if not the last col -->
            <xsl:when test="not(position()=last())">
                <xsl:text>,  1437
</xsl:text>
            </xsl:when>
            <xsl:otherwise>
                )  </xsl:otherwise>  1439
        </xsl:choose>
    </xsl:for-each>
</xsl:template>  1403

<xsl:template match="TYPE_NUM">  1421
    <xsl:choose>
        <xsl:when test=".='1'">
            <xsl:text>VARCHAR2</xsl:text>
            <xsl:apply-templates select="../LENGTH"/>  1427
        </xsl:when>
        <xsl:when test=".='2'">
            <xsl:choose>
                <xsl:when test="(../PRECISION_NUM) and not(../SCALE)">FLOAT</xsl:when>
                <xsl:otherwise>NUMBER</xsl:otherwise>
            </xsl:choose>
            <xsl:apply-templates select="../PRECISION_NUM"/>
        </xsl:when>
        <xsl:when test=".='8'">LONG</xsl:when>
```

```
      <xsl:when test=".='12'">DATE</xsl:when>
      <xsl:when test=".='23'">
        <xsl:text>RAW</xsl:text>
        <xsl:apply-templates select="../LENGTH"/>
      </xsl:when>
      <xsl:when test=".='24'">LONG RAW</xsl:when>
      <xsl:when test=".='69'">ROWID</xsl:when>
      <xsl:when test=".='96'">
        <xsl:text>CHAR</xsl:text>
        <xsl:apply-templates select="../LENGTH"/>
      </xsl:when>
      <xsl:when test=".='105'">MLSLABEL</xsl:when>
      <xsl:when test=".='112'">CLOB</xsl:when>
      <xsl:when test=".='113'">BLOB</xsl:when>
      <xsl:when test=".='114'">BFILE</xsl:when>
      <xsl:otherwise>OTHER</xsl:otherwise>
    </xsl:choose>
    <xsl:if test="../IS_NULL='1'">
      <xsl:text> NOT NULL</xsl:text>
    </xsl:if>
</xsl:template>  1421

<!-- This template used for both VARCHAR2(n), RAW(n), NUMBER(x,y) and
FLOAT(z)
      OK for
      VARCHARs because SCALE will not be present
-->
<xsl:template match="PRECISION_NUM | LENGTH">  1429
  <xsl:text>(</xsl:text>  1431
  <xsl:value-of select="."/>  1433
      <xsl:if test = "(../SCALE) and not(../SCALE='0')">
        <xsl:text>,</xsl:text>
        <xsl:value-of select="../SCALE"/>
      </xsl:if>
  <xsl:text>)</xsl:text>  1435
</xsl:template>  1429
```

AGGREGATING AND MANIPULATING DICTIONARY METADATA IN A DATABASE SYSTEM

CROSS REFERENCES TO RELATED APPLICATIONS

This patent application claims priority from U.S. Provisional Application No. 60/225,229, George H. Claborn, et al., Using object views, XML, XSL to aggregate, encode, and manipulate dictionary metadata, filed Aug. 14, 2000.

BACKGROUND OF THE INVENTION

1. Field of the Invention

The invention relates generally to database systems of the kind which store metadata in catalogs or data dictionaries and more specifically to techniques for reading and manipulating the metadata.

2. Description of Related Art

FIG. 1 provides an overview of the invention disclosed herein. A preferred embodiment of the invention is implemented in an improved version of the Oracle8™ Server, manufactured by Oracle Corporation, Redwood City, Calif. The Oracle8 server includes an object-relational database system. The object-relational database system appears in FIG. 1 as DBMS 103; prior to modification as required for the invention, DBMS 103 includes database 108, together with those tables 107 in data dictionary 106 that are required to implement database 108.

Information is stored in DBMS 103 as objects. In FIG. 1, all objects have the reference number 105. Objects are divided into classes according to the kind of information they contain. Shown in FIG. 1 are objects of the TABLE class 141, the TRIGGER class 143, the INDEX class 145, the UDT (user-defined type) class 147, and the VIEW class 149. Many other classes of objects exist as well in DBMS 103. Object classes that are of particular importance for the present discussion are TABLE class 141, UDT class 147, and VIEW class 149. DBMS 103 is a relational database system. In such systems, most of the data is stored in objects of TABLE class 141. As implied by the name, an object of TABLE class 141 contains a table. The table is made up of rows and columns. Each row has a field for each of the columns. A column specifies a kind of data value and a row represents an entity which has values of the kinds specified by the column. For example, in a table for storing personal information, the columns might be called last_name, first_name, m_i, street_addr, and so forth, with each row representing a person and the fields in the row having the appropriate values for that person.

DBMS 103 is an object relational database system. In such a system, the data values in a column may be objects which have user-defined types or UDTs. For instance, a user might define a type called contact_info which contained fields for all of the contact information for an individual and a column in a table of persons might specify a field for which the values are objects of type contact_info. Objects of class UDT are objects with user-defined types.

The objects of the TABLE class are what is termed base tables, that is, the information contained in an object of the TABLE class is stored as a table in DBMS 103's memory system. DBMS 103 has other tables which use the information contained in one or more base tables, but do not make separate copies of the information. These tables are termed views and the objects that represent views are objects of VIEW class 149. Views can be used to combine information from a number of different base tables and even other views. A kind of view which is of particular interest in the present discussion is an object view. An object view is a view that is associated with a user-defined type. Each row in the table specified by the object view is an object of the user-defined type associated with the object view. The information which the object view obtains from the base tables either directly or via other views is mapped into fields of the objects which make up the rows in the view.

The objects in DBMS 103 belong either to data dictionary 106 or to database 108. The information in data dictionary 106 is metadata, that is, information that defines all of the objects in DBMS 103, those in database 108, and also those in data dictionary 106. In the Oracle8 server, most of the objects in data dictionary 106 are TABLE objects 105 that belong to system tables 107. For example, there is a table named tab$ in system tables 107 that contains a row for every table defined in DBMS 103, including the tables in system tables 107.

A problem with present-day database systems is that there is no simple way of obtaining all of the metadata that describes an object 105 in DBMS 103. For example, to obtain a definition of a TABLE object 141, a user or a client executing a program written by a user may have to make over a dozen queries to retrieve table, column, object, partition, sub-partition, tablespace, index, grant, storage, nested-table and owner information associated with the base table. Moreover, in order to select the views to query, the user must know what subtype of object one is dealing with (e.g., relational vs. object table, partitioned vs. non-partitioned table, index-organized vs. heap table, temporary vs. persistent table), i.e., in order to obtain the metadata for an object, the user must have a good understanding of the structure of data dictionary 106.

The difficulty of obtaining the metadata for an object adds to the expense and effort required to use and maintain DBMS 103. For example, in today's networked environment, it is often useful to have partial copies of database 108 at different locations within the network. To make such a partial copy, one needs to extract the metadata from data dictionary 106 that defines the partial copy and then use that information to create the partial copy. Easy access to information about the logical structure of a database is of course also useful whenever one is modifying the database's logical structure. In present-day database systems, a user who wishes to obtain a useful definition of an object in the database faces three main problems:

No Simple Means of Obtaining Complete Database Object Definitions

Present-day database systems provide no facility which permits a user to obtain the complete definition of any object in DBMS 103. The Oracle8 server provides an example of what is available in present-day systems for obtaining metadata from data dictionary 106. The Oracle8 server provides a series of views onto data dictionary 106, but, like the tables within the data dictionary itself, these views are normalized for efficiency; hence, several queries against multiple views need to be executed in order to retrieve the complete metadata for what is logically a single object in the database.

No Means to Perform Transformations on Database Object Definitions

Often, the reason for extracting a definition of an object is to transform it. For example, a client that is maintaining a local copy of a portion of a database generally wishes to perform transformations such as adding a column to a table, changing a table definition into a snapshot definition, changing object ownership, removing specific storage attributes, etc. Today, the client requires custom code to perform these sorts of transformations.

No Means to Generate Creation SQL DDL for Database Objects

Once an object's definition is extracted and perhaps transformed, a client invariably wants to recreate that object somewhere; perhaps in another schema of the source database or perhaps in some other target database. In SQL databases such as that provided by the Oracle8 server, objects are created by defining them in a data definition language (DDL) and then providing the DDL to the database system, which creates the object as defined in the DDL. Present-day database systems provide no simple way of getting from the metadata for an object to the DDL needed to create another such object. At present, the client must use custom code to produce this DDL from the metadata for the object.

The absence of a facility which makes it easy to obtain complete and accurate metadata for objects in the database also to put the metadata into a form which makes it easy not only to modify the metadata, but also to produce creation DDL from the metadata has led to large amounts of duplicated effort within the organizations that produce database systems and even larger amounts of duplicated effort within the organizations that use the database systems. It is thus an object of the invention disclosed herein to provide a facility that makes extraction of metadata for objects from the data dictionary easy and further puts the metadata into a form such that it can be easily modified and easily used to create the objects they describe. It is further an object of the invention to provide techniques that generally simplify the aggregation of data that is stored in a plurality of objects in a database system.

SUMMARY OF THE INVENTION

The foregoing objects of the invention are achieved by apparatus for aggregating data stored in a number of objects. The apparatus associates a kind of data to be aggregated with a user-defined type that defines an object for containing the aggregated data and an object view that specifies the locations of the data to be aggregated and has an application program interface that includes a fetch interface that causes the database system to make a query over the object view associated with the kind of data to be aggregated that obtains the data to be aggregated from a plurality of objects and returns an object of the user-defined type associated with the kind that contains the aggregated data.

In another aspect of the invention, there are a number of different kinds of data to be aggregated. The apparatus associates a name with a kind of data to be aggregated and associates the user-defined type and the object view with the name. The fetch interface responds to a name of a kind of data by making a query over the object view associated with the name that returns and object of the user-defined type associated with the name. The application program interface may further include a filter interface that permits a client of the database system to specify a filter that restricts the query over the object view. The filter may also be associated with the name of the kind of data.

In a further aspect of the invention, the apparatus may convert the contents of the returned object of the user-defined type into an intermediate form. The application program may further include a transform interface that permits a client of the database system to specify a transformation of the intermediate form.

One application for the invention is retrieving metadata for objects belonging to a given class from the data base's data dictionary. In this application, the user-defined type, the object view, and the filter are all associated with the name of the class. One of the transformations from the intermediate form is creation DDL for an object whose metadata has been retrieved by the apparatus. XML is a particularly useful intermediate form, with transformations being made using XSL stylesheets.

Other objects and advantages will be apparent to those skilled in the arts to which the invention pertains upon perusal of the following Detailed Description and drawing, wherein:

BRIEF DESCRIPTION OF THE DRAWING

FIG. 1 is a block diagram of a database system in which the invention is implemented;

FIG. 2A is a first part of a programming example showing how the invention is used;

FIG. 2B is a second part of the programming example of FIG. 2A;

FIG. 2C is a third part of the programming example of FIG. 2A;

FIG. 3 is a table of classes of objects whose definitions may be retrieved using API 120;

FIG. 4A is a first portion of a table of the filters that can be used to specify sets of objects belonging to a class;

FIG. 4B is a second portion of the table of FIG. 4A;

FIG. 5A is a first portion of a table of the filters that can be applied to objects of TABLE class 141;

FIG. 5B is a second portion of the table of FIG. 5A;

FIG. 6 is a table of the items that can be specified in the set_parse_item procedure;

FIG. 7A is a first portion of the table of the transform parameters that can be set for the DDL transform;

FIG. 7B is a second portion of the table of FIG. 7A;

FIG. 8 is the definition of user-defined types used in the interfaces of certain of the procedures and functions of API 120;

FIG. 9A is a first part of definitions of tables belonging to aggregation metadata 109;

FIG. 9B is a second part of the definitions of FIG. 9A

FIG. 10A is a first part of a definition of a UDT 110 used to aggregate metadata about objects of the TABLE class;

FIG. 10B is a second part of the definition of FIG. 10A;

FIG. 11 is a definition of a view 111 used with the UDT of FIG. 10;

FIG. 12 is the creation DDL for an example TABLE object, SCOTT.BONUS;

FIG. 13A is a first part of the XML representation of object 121 for the table SCOTT.BONUS;

FIG. 13B is a second part of the XML representation of FIG. 13A;

FIGS. 14A–B is a portion of the XSL style sheet used to transform the XML representation into the creation DDL.

Figure 15:
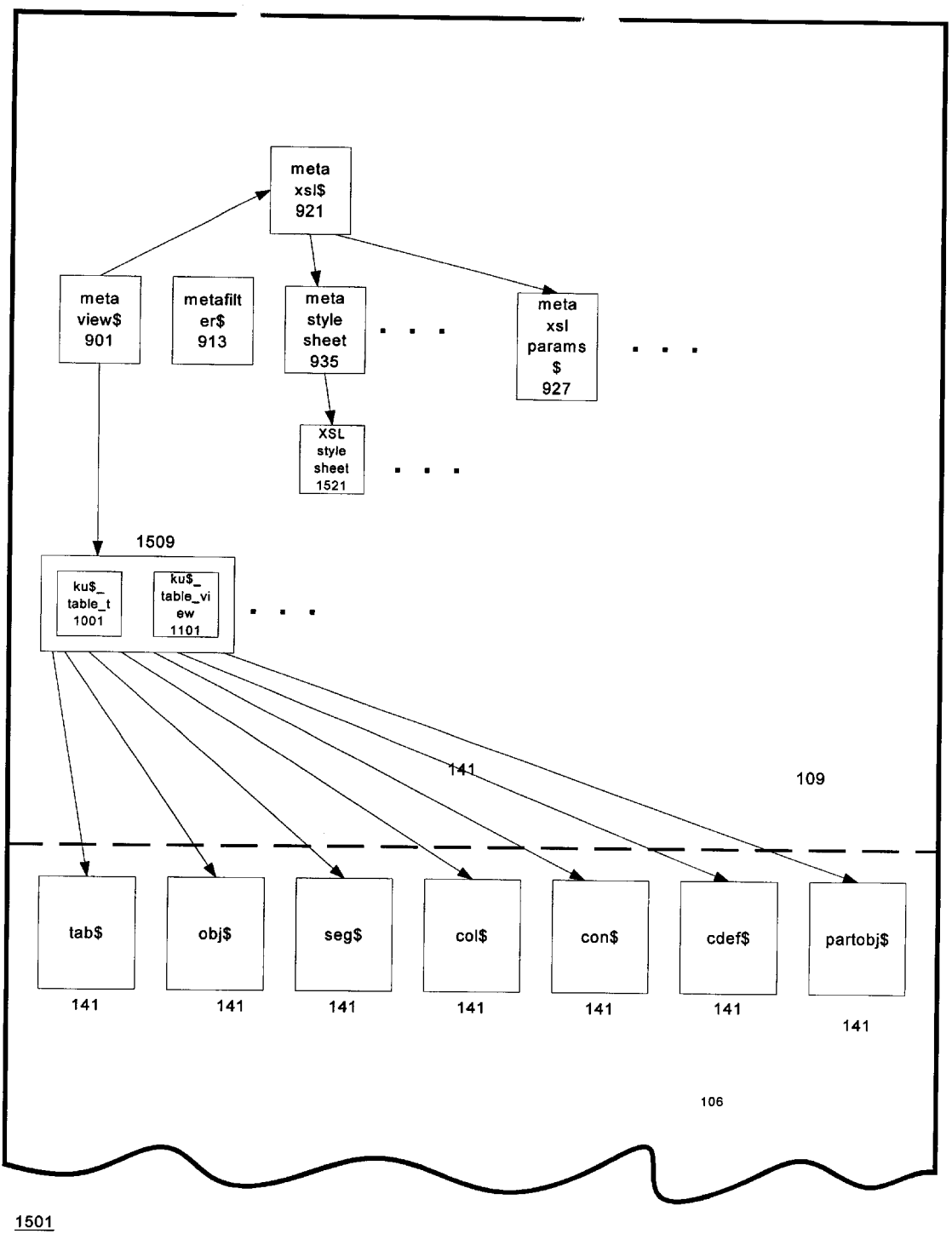
FIG. 15 is a detailed diagram of aggregation metadata 109.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The Detailed Description will first present an overview of the invention and an example of its use and will then present details of a preferred embodiment.

Overview of the Invention: FIG. 1

FIG. 1 shows a system 101 in which the invention is implemented. system 101 is part of the Oracle9i Server, manufactured by Oracle Corporation. As explained in the Description of related art, DBMS 103 is an object relational database. Data is stored in objects 105. The objects in data dictionary 106 contain metadata which describes all of the objects in DBMS 103.

Added to DBMS 103 is aggregation metadata 109 in data dictionary 106 and metadata aggregation application program interface (API) 120, which contains code that uses information in aggregation metadata 109 to obtain metadata 121 about objects 105 from data dictionary 106, uses XML generator 125 to make an XML representation 135 of the information, and uses XML transformer 127 to transform XML representation 135 to obtain a desired output 137 such as a DDL description of one or more objects 105. In the preferred embodiment, XML generator 125 and XML tranformer 127 are generally-accessible components of DBMS 103. XML generator 125 receives a query, executes it, and transforms the result into an XML document. XML transformer 127 receives an XML document and a transform specifier and transforms the XML as specified by the transform specifier.

XML (Extensible Markup Language) is a standard language for defining application / industry-specific tagged dialects for description of the definer's unique data. XML is particularly useful for this purpose because it separates the description of the dialect from the content of the data for which the dialect is to be used. The separation of description and content permits easy parsing and transformation of XML documents using industry standard tools. For more information about XML, see http://www.w3.org/XML. In other embodiments, other intermediate representations may be employed. XML documents may be transformed by means of style sheets written in XSL. In its most general form, XSL is a way to transform an XML document into something else based on a set of rules embodied in the stylesheet. The output is another XML document, or HTML, or SQL text, or whatever else may be specified by the stylesheet. Recently, it has been recognized that the data transformation aspects of XSL are so powerful that they have been separated from the presentation rules and renamed XSL-T. For details, see http://www.w3.org/Style/XSL.

Continuing in more detail, the aggregation metadata 109 include a number of aggregation user-defined types 110. Each aggregation user-defined type 110 corresponds to a class of objects 105. An aggregation UDT 110 defines fields for all of the metadata needed to make a definition of an object belonging to the class to which the UDT 110 corresponds. An object that has an aggregation UDT will be termed hereinafter an aggregation object. Corresponding to each aggregation user-defined type 110, and thus to a class of objects, is an object view 111 which maps the sources in system tables 107 for metadata for objects of the class onto the fields of the aggregation UDT 110 for the class. Such an object view will be termed hereinafter an aggregation object view. Query generator 123 makes a query 119 over aggregation object view 111 for the class that obtains the metadata for a set of objects of the class. The query returns a set 121 of aggregation objects of the class's UDT 110. Each aggregation object returned by the query contains the metadata for one of the objects belonging to the set of objects of the class.

The set 121 of returned aggregation objects goes to XML generator 125 in metadata aggregation API 120, which generates an XML document 135 that contains the metadata from the set of aggregation objects 121. If the XML document needs to be transformed in any way, for example, into a DDL specification that uses the information from an aggregation object, the transformation can be done in XML transformer 127. The client may of course simply take XML output 135 from API 120 and apply its own transforms to the XML output.

The remaining components of aggregation metadata 109 permit refinement of query 119 and specification of the transformations produced by XML transformer 127. Filter specifications 113 are specifications for restricting the set of objects for which the query 119 retrieves the metadata. For example, aggregate view 111 might be for the class of TABLE objects; a filter specification 113 can be used to limit the information retrieved by query 119 to the metadata for the set of TABLE objects whose names include the word PAYROLL. When a filter is specified in API 120, query generator 123 adds a WHERE clause to query 119 which specifies that the returned result will be limited to a subset of the rows in aggregation view 111 that have the property specified in the filter. Transform specifications 115 are specifications that describe transformations made by XML transformer 127 on the XML produced from the set 121 of aggregation objects; one such transformation is the transformation from XML to DDL.

In the preferred embodiment, a client which is using API 120 does so by first specifying the class of objects for which descriptions are to be obtained (129), then specifying one or more filters for the query 119 (131), then specifying one or more transformation specifications (139) indicating how the XML produced from the set 121 of aggregation objects returned by the query is to be transformed (139). When all of this has been specified, the client issues a fetch command 133, which causes query generator 123 to make a query 119 on the aggregation object view 111 for the class that has been restricted as specified by the filters 113 and provide query 119 to XML generator 125, which executes the query and generates XML document 135 from the set of returned objects 121 (135). If any transform specifications 115 were specified, aggregation object processor 124 causes XML transformer 127 to transform XML document 135 as specified in the transforms specifications 115 to produce transformed result 137 and then outputs transformed result 137.

It should be pointed out here that the techniques used in system 101 to map information in objects 107 to fields in an aggregation object and to generate XML from the information in the aggregation object can be used to produce metadata in any form which may be useful to a client, and can thus be used to produce metadata according to a number of different models. Thus, though the metadata produced in the preferred embodiment conforms to the Oracle metadata model, system 101 can also produce metadata that conforms to the ANSI-1999 SQL model. All that is required to fetch the metadata for a class of objects 105 according to a given model is making a UDT 110 and object view 111 for the class and model. In the preferred embodiment, the class and model constitute a name for the information aggregated by the UDT 110 and object view 111 and API 120 associates UDT 110 and object view 111 with the name. If there is a standard form in which the model is expressed, a transform specification 115 can be added which produces that form from the XML generated from the set 121 of aggregation objects returned by the query. In some cases, model differences may even be dealt with by simply transforming the XML as required for the model in question.

It should further be pointed out that the techniques used in system 101 are not limited to retrieving and transforming metadata, but can be employed in any situation where information needs to be aggregated from a number of different objects in database 108. One way of doing this is simply to define a name for a new class of information in API 120, define a UDT that contains an instance of the aggregated information, define an object view whose rows are objects of the UDT, and associate at least the UDT and object view with the name for the new class of information. When that is done, API 120 can be used to aggregate the new information.

Another way of doing it is to make a new API that works on the same principles as API 120. If the new API is only going to aggregate one kind of information, it need not even name the aggregated information, since the UDT and object view can be simply associated with the new API. As in API 120, filters may be defined and associated with the API, an intermediate form such as XML may be generated from the aggregated information in the objects of the UDT, and the intermediate form may be transformed as specified in transform specifications. If the API is to retrieve a number of different kinds of information, the kinds of information to be retrieved may be given names, the UDT, object view, and filters for a given kind of information may be associated with the name for the given kind of information, and the name may be used in the API in the same fashion as the name for a class of objects is used in API 120.

One example of a system like system 101 that is used to aggregate information other than metadata is a system that aggregates the information from the database that is needed to generate a purchase order. As is the case with metadata, the information needed for a purchase order tends to be contained in a wide variety of objects. In such a system, the XML document containing the aggregated information would be transformed as required to produce a purchase order.

DETAILS OF A PREFERRED EMBODIMENT

In the following, there will first be presented an overview of the programming interface to system 101 and an example program for obtaining descriptions of metadata, then a detailed description of the programming interface, and finally examples of an aggregation UDT 110, an aggregation view 111 using the example UDT, the XML output produced from the aggregation object 121 returned by the query, and the DDL produced from the XML.

The Programming Interface to System 101

From a programmer's point of view, system 101 has an open-fetch-close programming paradigm. A program executed by a client will generally use the procedures and functions provided by API 120 as follows:

1. A call to 'OPEN' is made describing the class of object 105 for which metadata is being requested (tables, indexes, etc). A handle is then returned to be used in all subsequent operations for the set of objects for which metadata is being requested.
2. 'SET_FILTER' is then called (perhaps multiple times) to further refine and restrict the set of objects to be fetched. This establishes the WHERE clause predicates on the query that will be executed against the appropriate aggregation view(s) 111. A large variety of filter criteria are available for each class of object; common ones are object name and schema expression matching. For tables, special filter criteria are available to specify heap storage only (no IOTs), non-partitioned, relational only (no object tables), etc. If specified, these allow query generator 123 to prune the set of object views to be queried for higher performance.
3. 'ADD_TRANSFORM' may optionally be called (perhaps multiple times) to specify various transformations that are to be executed on the resultant XML documents. The transformations are specified by means of XSL-T stylesheets. The caller may specify the URL of its own private stylesheet; for example, to remove or add a column to a table's metadata. Or, the caller may specify 'DDL' which tells API 120 to generate creation DDL for the object using its own stylesheets. In either case, a transform handle is returned. This handle is different from the handle returned by OPEN. It is used to further refine the transform as described in the next step.
4. 'SET_TRANSFORM_PARAM' may then be called (perhaps multiple times) using the transform handle from the previous step. This allows the caller to pass transform-dependent runtime values to the XSL-T stylesheet. Some of the various transform options that can be specified are: 'Don't include constraints', 'Don't include storage or tablespace clauses', 'Pretty print the output', 'Do/don't include the SQL terminator character (;)', 'Do/don't include package or type bodies with their specifications'.
5. Once the preliminary setup is complete, the calling program will loop, calling one of the various 'fetch' functions to retrieve and output the metadata for objects matching the selection criteria. The metadata will be output either as an XML document or as creation DDL.
6. The fetch functions return NULL when there is no more metadata for database objects that match the selection criteria specified in the open and filter routines. The CLOSE function should then be called with the handle from step 1. API 120 will then clean up any currently allocated resources.

An Example Program Using the Metadata Aggregation API: FIGS. 2A–2C

FIGS. 2A–2C show a procedure get_payroll_tables 201 that is written in the PL/SQL language. get_payroll_tables 201 retrieves table definitions for a user of the database system. The table definitions belong to a schema associated with the user, that is, a collection of objects 105 associated with the user. In this case, the schema belongs to a user of DBMS 103 for which a client is executing the procedure. The procedure returns the metadata for all objects in the client's schema that have the class TABLE and whose names begin with PAYROLL and the metadata for each table's indexes.

Beginning with FIG. 2A, at 203 are shown declarations for variables representing handles for collections of data produced or used by API 120. tableOpenhandle is the handle for the table metadata that will be returned by the procedure; indexOpenHandle is the handle for the index metadata that will be returned by the procedure; tableTransHandle is the handle for the transforms that will be used on the XML generated from the table metadata returned by the procedure; and indexTransHandle is the handle for the transforms that will be used on the XML generated from the index metadata returned by the procedure. In both cases, the transform will make DDL from the XML. At 205 are shown declarations for character strings for storing schema and table names returned by the procedure. At 207 are shown declarations for objects that will be used to hold the DDL and the list of indexes produced by the procedure; at 209, finally, there is a declaration for a character large object (CLOB) which will hold the DDL for the indexes.

Continuing with the code, at 211, the output file which will contain the DDL for the tables and indexes whose metadata are returned by the procedure is opened. At 213, the open procedure of API 120 is used to begin setting up API 120. The 'TABLE' argument used with open indicates that the API 120 will be returning metadata for objects of the TABLE class. open returns a handle, which is assigned to tableOpenHandle. At 215, the first of the filters is specified. The API's set_count procedure specifies how the metadata for the table objects is to be returned. In this case, it specifies that the metadata will be returned one object at a time. At 217, the API's set_filter procedure specifies that metadata for a table will be returned only if the table's name starts with the string PAYROLL. Further filters at 219 and 221 specify that each retrieved table's schema and name will be parsed out separately so that they can be used with API 120 to retrieve the indexes of the tables. Note that with all of these procedures, the handle value in tableOpenHandle is used to identify the context in which the filter is to operate.

Next, the code specifies the transforms. At 223, the main transform is specified, namely that the result is to be transformed into DDL for the tables. Function add_transform 223 is invoked with the open handle value and a specification, 'DDL', of the transform, and returns a handle for the transform, which is assigned to tableTransHandle. The transform handle is then used to further define the transform at 225. Two invocations of API 120's set_transform_param procedure specify that no physical storage information is to be included in the DDL and that there will be an SQL terminator on the DDL for each table. At this point, the set up is completed and the information about the tables may be fetched. The information will be fetched using a query 119 that is made using the object specification from open and the filters specified by set_count, set_filter, and set_parse_item. As the information is fetched, XML will be generated from it and will then be transformed into DDL as specified by add_transform and set_transform_param.

The fetching and processing of the results is done in FIGS. 2B and 2C. Beginning with FIG. 2B, a loop 227 (continued in FIG. 2C) repeatedly executes the API 120 function fetch_ddl 229. Each time the function is executed, it retrieves the metadata for a table that belongs to the schema of the user for whom the client is executing the get_payroll_tables procedure and that conforms to the restrictions specified in the filters, parses out the table's schema name and table name from the metadata, and transforms the XML generated from the metadata into DDL as specified by the transforms. As shown at 231, the loop terminates when there is no more metadata to be fetched for tables that match the search criteria. Other fetch functions will return the XML for the metadata itself or a CLOB that contains either XML or DDL, depending on the transforms applied to the XML.

As each instance of table metadata is fetched, XML is generated from it, and the XML is transformed into DDL. Additionally, the metadata is parsed to obtain the table's name and schema name. The DDL made from the metadata is assigned to the variable tableDDLs, which is a collection whose elements are DDL statements and a nested table of any parse items specified using set_parse. In the present case, the collection will always have only 1 element. At 233, this element is assigned to tableDDL. Next, tableDDL.ddltext, which contains the DDL made from the XML resulting from the execution of fetch is output to the output file. Then tableDDL.parsedItems, which contains the parsed out schema and table names is assigned to a vector of parsed items. Here, the vector will always only have two elements, one for the table name and one for the schema name. Since there is no guarantee of the order in which the table name and schema name will appear in the vector, the code at 235 checks and depending on what it finds, assigns the name to schemaName or tableName.

FIG. 2C shows the portion of get_payroll_tables which gets and processes the indexes of the table which has just been retrieved at 229. At 239, API 120's open function is used as before, but this time, it specifies that the metadata being retrieved is that for objects of the INDEX class. The returned value is a handle for the index processing context. Next, set_filter is used at 241 and 243 to specify that the index information be returned for the table belonging to the schema (specified by schemaName) and having the table name (specified by tableName) returned for the table retrieved at 229. Then at 245–247, the transforms are specified. The XML for the indexes for the table is to be transformed into DDL, again without data storage information and with SQL terminators. Finally, at 251, a loop is executed which uses the fetch_clob variant of API 120's fetch function to fetch and transform each index value for the table and output the transformed index value to the output file. The loop terminates when there are no more index values for the table. Thus, in the output file, the DDL for each fetched table will be followed by the DDL for its indexes. The close procedure at 253 frees the resources used by API 120 and after that, the output file is closed.

As can be seen from the get_payroll_tables procedure, a client of a DBMS 103 that has metadata aggregation API 120 can obtain the creation DDL for a set of objects 105 belonging to a given class without having any knowledge whatever of the details of the actual arrangements for specifying the metadata for the objects in system tables 107. Moreover, the filters permit the client to specify exactly the objects for which metadata will be retrieved. The transforms, finally, permit the client to closely define the DDL output. The API permits specification of multiple filters and transforms, with the output of one transform serving as the input to the next. Additionally, since API 120 actually produces an XML representation of the metadata and produces the DDL output by applying an XSL-T style sheet to the XML representation, other transforms can be easily added to API 120 and the client can also take the XML representation and apply its own XSL-T style sheets to it. Finally, API 120 can easily be extended to handle different models of metadata by adding new aggregation UDT's 110 and aggregation object views 111, together with whatever new filter specifications 113 are required for queries over the new object views, and transform specifications 115 can be added as needed to deal with the XML produced from objects having the type of the new aggregation UDT.

Details of a Preferred Embodiment of Metadata Aggregation API 120: FIGS. 3–8

The following discussion will first provide a detailed specification of the interfaces for the procedures and functions employed in a preferred embodiment of API 120 and of the operations which they perform and will thereupon give details of aggregation metadata 109 in a preferred embodiment and of XML and creation DDL produced using API 120.

DBMS_METADATA.OPEN( )

```
FUNCTION open
        (   object_type    IN VARCHAR2,
            version        IN VARCHAR2 DEFAULT
                              'COMPATIBLE',
            model          IN VARCHAR2 DEFAULT
                              'ORACLE'
        ) RETURN NUMBER;
```

OPEN specifies the class of object for which metadata is to be retrieved, the version of its metadata, and the model for the metadata. The return value is an opaque context handle for the set of objects that will be returned with the metadata.

Parameters object_type—the class of object for which metadata to be retrieved. FIG. 3 lists the currently-valid class names and their meanings. Most objects have names, belong to schemas, and are uniquely identified within their namespace by their schema and name. Some objects may not be schema objects, for example objects that represent users; other objects may not have names. These differences are relevant when choosing object selection criteria. See SET_FILTER, below. As is apparent from the foregoing discussions, system 101 may be extended to retrieve metadata for any class of objects used presently or in the future in DBMS 103.

version—the version of metadata to be extracted. Database objects or attributes that are incompatible with the version will not be extracted. Legal values for this parameter are 'COMPATIBLE'—(default) the version of the metadata corresponds to the database compatibility level and the compatibility release level for feature.

'LATEST'—the version of the metadata corresponds to the version of DBMS 103.

A specific database version.

model—The API can support views corresponding to different metadata models such as Oracle proprietary, ANSI99, Common Warehouse Metadata (CWM). model specifies which aggregation UDTs 110 and aggregation object views 111 will be used by fetch. The object and model parameters together are thus the name with which the aggregation UDTs and aggregation object views are associated in the preferred embodiment.

Returns an opaque handle to the class of objects. This handle is used as input to the API functions and procedures SET_FILTER, SET_COUNT, ADD_TRANSFORM, GET_QUERY, SET_PARSE_ITEM, FETCH_xxx and CLOSE.

Exceptions

| Exception | Description |
|---|---|
| INVALID_ARGVAL | A NULL or invalid value was supplied for an input parameter. The error message text identifies the parameter. |
| INVALID_OBJECT_PARAM | The version or model parameter was not valid for the object_type. |

DBMS_METADATA.SET_FILTER( )

```
PROCEDURE set_filter
        (   handle    IN NUMBER,
            name      IN VARCHAR2,
            value     IN VARCHAR2);
PROCEDURE set_filter
        (   handle    IN NUMBER,
            name      IN VARCHAR2,
            value     IN BOOLEAN DEFAULT
                         TRUE);
```

SET_FILTER specifies restrictions on the objects to be retrieved, e.g., the object name or schema. There are two versions of the procedure, one that uses a filter with a Boolean value and another that uses a filter with a character string value.

Parameters handle—the handle returned from OPEN.
name—the name of the filter. FIG. 4 is a table 401 that lists for each filter the class of objects the filter applies to, the filter's datatype (text or boolean) and its meaning or effect (including its default value, if any). FIG. 5 is a table 501 that lists the filters for the table class.
value—the value of the filter.

Exceptions

| Exception | Description |
|---|---|
| INVALID_ARGVAL | A NULL or invalid value was supplied for an input parameter. The error message text identifies the parameter. |
| INVALID_OPERATION | The user called SET_FILTER after the first call to FETCH_xxx for the OPEN context. Once the first call to FETCH_xxx has been made, no further calls to SET_FILTER are permitted. |
| INCONSISTENT_ARGS | The filter name is not valid for the object type associated with the OPEN context, or the filter value is the wrong datatype. |

Security

SET_FILTER allows the caller to specify the schema of objects to be retrieved, but security considerations may override this specification. If the caller has the necessary privileges, then any object may be retrieved; otherwise, only (a) schema objects owned by the caller or (b) privileges granted to or by the caller may be retrieved. If callers request objects they are not privileged to retrieve, no exception is raised; the object is simply not retrieved, just as if it did not exist.

DBMS_METADATA.SET_COUNT( )

```
PROCEDURE set_count
                  (    handle    IN NUMBER,
                       value     IN NUMBER);
```

SET_COUNT specifies the number of objects to be retrieved in a single FETCH_xxx call. By default, each call to FETCH_xxx returns one object. SET_COUNT allows one to override this default. If FETCH_xxx is called from a client, specifying a count value greater than one can result in fewer server round trips and, therefore, improved performance.

Parameters handle—the handle returned from OPEN.
value—the number of objects to retrieve.

Exceptions

| Exception | Description |
| --- | --- |
| INVALID_ARGVAL | A NULL or invalid value was supplied for an input parameter. The error message text identifies the parameter. |
| INVALID_OPERATION | The user called SET_COUNT after the first call to FETCH_xxx for the OPEN context. Once the first call to FETCH_xxx has been made, no further calls to SET_COUNT are permitted. |

DBMS_METADATA.GET_QUERY( )

```
FUNCTION get_query
                  (    handle    IN NUMBER)
                       RETURN VARCHAR2;
```

GET_QUERY returns the text of the query (or queries) that will be used by FETCH_xxx. This function is provided to assist in debugging.

Parameters handle—the handle returned from OPEN.

Returns the text of the query (or queries) that will be used by FETCH_xxx.

Exceptions

| Exception | Description |
| --- | --- |
| INVALID_ARGVAL | A NULL or invalid value was supplied for the handle parameter |

DBMS_METADATA.SET_PARSE_ITEM( )

```
PROCEDURE set_parse_item
                  (    handle    IN NUMBER,
                       name      IN VARCHAR2);
```

SET_PARSE_ITEM (1) enables output parsing and (2) specifies an object attribute to be parsed and returned.

Parameters handle—the handle returned from OPEN.
A name—the name of the object attribute to be parsed and returned. Table 601 in FIG. 6 lists for each valid attribute its name, the object class it applies to, and its meaning.

Exceptions

| Exception | Description |
| --- | --- |
| INVALID_ARGVAL | A NULL or invalid value was supplied for an input parameter. The error message text identifies the parameter. |
| INVALID_OPERATION | The user called SET_PARSE_ITEM after the first call to FETCH_xxx for the OPEN context. Once the first call to FETCH_xxx has been made, no further calls to SET_PARSE_ITEM are permitted. |
| INCONSISTENT_ARGS | The attribute name is not valid for the object type associated with OPEN context. |

Usage

By default fetch_xml and fetch_ddl simply return an object's metadata as XML or creation DDL. By calling SET_PARSE_ITEM one can request that metadata describing individual attributes of the object be returned as well. This is useful when fetching objects based on the value of a returned object, e.g., fetching indexes for a returned table.

One can call SET_PARSE_ITEM multiple times to ask for multiple items to be parsed and returned. Parsed items are returned in the sys.ku$_parsed_items nested table. For a fuller discussion of this topic see FETCH_xxx, "Usage," below.

DBMS_METADATA.ADD_TRANSFORM( )

```
FUNCTION add_transform
                  (    handle    IN NUMBER,
                       name      IN VARCHAR2)
                       RETURN NUMBER;
```

ADD_TRANSFORM specifies a transform that FETCH_xxx applies to the XML representation of the retrieved objects. It is possible to add more than one transform. See "Usage," below.

Parameters handle—the handle returned from OPEN.
name—the name of the transform. If name is "DDL" creation DDL will be generated using XSL-T scripts provided in transform specs 115. If name contains a period (.), colon (:) or forward slash (/), it is interpreted as the URL of a user-supplied XSL-T script.

Returns an opaque handle to the transform. This handle is used as input to SET_TRANSFORM_PARAM. Note that this handle is different from the handle returned by OPEN; it refers to the transform, not the set of objects to be retrieved.

Exceptions

| Exception | Description |
|---|---|
| INVALID_ARGVAL | A NULL or invalid value was supplied for an input parameter. The error message text identifies the parameter. |
| INVALID_OPERATION | The user called ADD_TRANSFORM after the first call to FETCH_xxx for the OPEN context. Once the first call to FETCH_xxx has been made, no further calls to ADD_TRANSFORM are permitted. |

Usage

By default (i.e., with no transforms added) objects are returned as XML documents. One can call ADD_TRANSFORM to specify an XSL-T script to transform the returned documents.

One can call ADD_TRANSFORM more than once to specify that multiple transforms are to be applied to the returned XML documents. FETCH_xxx will apply the transforms in the order in which they were specified, the output of the first transform being used as input to the second and so on. Note that the output of the "DDL" transform is not an XML document and that consequently no further transforms of it are possible.

DBMS_METADATA.SET_TRANSFORM_PARAM( )

```
PROCEDURE set_transform_param
          ( transform_handle  IN NUMBER,
            name              IN VARCHAR2,
            value             IN VARCHAR2);
PROCEDURE set_transform_param
          ( transform_handle  IN NUMBER,
```
```
            name              IN VARCHAR2,
            value             IN BOOLEAN
                              DEFAULT TRUE);
```

SET_TRANSFORM_PARAM specifies parameters to the XSL-T stylesheet identified by transform_handle. There are two versions of the procedure: one for transform parameters having character values and one for transform parameters having Boolean values.

Parameters transform_handle—either (1) the handle returned from ADD_TRANSFORM, or (2) the enumerated constant SESSION_TRANSFORM which designates the "DDL" transform for the whole session. See "Usage," below. Note that the handle returned by OPEN is not a valid transform handle.
name—the name of the parameter. Table 701 in FIG. 7 lists the transform parameters defined for the "DDL" transform. For each transform parameter, the table specifies specifying the class of objects the parameter applies to, the parameter's datatype (always Boolean in table 701), and its meaning or effect (including its default value, if any).
value—the value of the transform.

Exceptions

| Exception | Description |
|---|---|
| INVALID_ARGVAL | A NULL or invalid value was supplied for an input parameter. The error message text identifies the parameter. |
| INVALID_OPERATION | The user called SET_TRANSFORM_PARAM after the first call to FETCH_xxx for the OPEN context. Once the first call to FETCH_xxx has been made, no further calls to SET_TRANSFORM_PARAM are permitted. |
| INCONSISTENT_ARGS | The transform parameter name is not valid for the object type associated with the OPEN context. |

Usage

XSL-T stylesheets may have parameters that are passed to them at runtime. SET_TRANSFORM_PARAM is used in API 120 to specify the value of a parameter of the stylesheet identified by transform_handle. The most general way to specify stylesheet parameter values is as text strings, but for the "DDL" transform it is convenient to use Boolean values to set parameters. Consequently, two variants of the procedure are provided.

DBMS_METADATA.FETCH_xxx( )

A preferred embodiment includes the following versions of the FETCH functions and procedures:
 FUNCTION fetch_xml (handle IN NUMBER)
  RETURN XMLType;
 FUNCTION fetch_ddl (handle IN NUMBER)
  RETURN sys.ku$_ddls;
See 807 and 809 in FIG. 8 for the specification of sys.ku$_ddls.
 FUNCTION fetch_clob (handle IN NUMBER)
  RETURN CLOB;

PROCEDURE fetch_clob (handle IN NUMBER,
xmldoc IN OUT NOCOPY CLOB);

FETCH_xxx returns metadata for objects meeting the criteria established by OPEN, SET_FILTER, etc. Other embodiments may also include the following variant:

FUNCTION fetch_xml (handle IN NUMBER, parsed_items OUT sys.ku$_parsed_items)
RETURN XMLType;

See 803 and 805 in FIG. 8, for the specification of sys.ku$_parsed_items.

The different variants are discussed in "Usage," below.

Parameters handle—the handle returned from OPEN.

xmldoc (procedure fetch_clob)—the document that contains the metadata for the object(s) or NULL if all objects have been returned. The form of the metadata in the document depends on the transforms applied to the XML.

parsed_items (fetch_xml)—a nested table containing the items specified by SET_PARSED_ITEM. NULL is returned if (1) SET_PARSED_ITEM was not called or (2) more than one object is being returned (i.e., SET_COUNT was called specifying a count greater than 1).

Returns the metadata for the object(s) or NULL if all objects have been returned.

Exceptions

Most exceptions raised during execution of the query will be propagated to the caller. Also, the following exceptions may be raised.

| Exception | Description |
| --- | --- |
| INVALID_ARGVAL | A NULL or invalid value was supplied for an input parameter. The error message text identifies the parameter. |
| INCONSISTENT_OPERATION | Either (1) FETCH_XML was called when the "DDL" transform had been specified, or (2) FETCH_DDL was called when the "DDL" transform had not been specified. |

Usage

These functions and procedures return metadata for objects meeting the criteria established by the call to OPEN that returned the handle and the subsequent calls to SET_FILTER, SET_COUNT, ADD_TRANSFORM, etc. Each call to FETCH_xxx returns metadata for the number of objects specified by SET_COUNT (or less, if fewer objects remain) until all metadata for the set of objects specified by SET_FILTER has been returned. After metadata for the last object in the set is returned, subsequent calls to FETCH_xxx return NULL and cause the stream created by OPEN to be transparently closed.

There are several different FETCH_xxx functions and procedures:

FETCH_XML returns the XML metadata for an object as an XMLType. It assumes that if any transform has been specified, that transform will produce an XML document. In particular, it assumes that the "DDL" transform has not been specified. FETCH_XML is overloaded: one variant simply returns the object metadata in XML; the other also returns a nested table of parsed items as an OUT parameter.

FETCH_DDL returns the creation DDL in a sys.ku$_ddls nested table; it assumes that the "DDL" transform has been specified. Each row of the sys.ku$_ddls nested table contains a single DDL statement in the ddlText column; if requested, parsed items for the DDL statement will be returned in the parsedItems column. Multiple DDL statements can be returned (1) when the user called SET_COUNT to specify a count greater than 1 or (2) when the XML for the metadata is transformed into multiple DDL statements (e.g., Metadata for a TYPE object can be transformed into both CREATE TYPE and CREATE TYPE BODY statements. Metadata for a TABLE object can be transformed into a CREATE TABLE and one or more ALTER TABLE statements.)

FETCH_CLOB simply returns the object, transformed or not, as a CLOB.

If SET_PARSE_ITEM was called, FETCH_XML and FETCH_DDL return attributes of the object's metadata (or the DDL statement) in a sys.ku$_parsed_items nested table. For FETCH_XML the nested table is an optional OUT parameter; for FETCH_DDL it is a column in the returned sys.ku$_ddls nested table. Each row of the sys.ku$_parsed_items nested table corresponds to an item specified by SET_PARSE_ITEM and contains the following columns:

item—the name of the attribute as specified in the name parameter to SET_PARSE_ITEM.

value—the attribute's value, or NULL if the attribute is not present in the object or DDL statement.

parent—for future use.

The order of the rows is undetermined; to find a particular item the caller must search the table for a match on item.

If SET_PARSE_ITEM was not called (or if FETCH_XML is returning multiple objects), NULL is returned as the value of the sys.ku$_parsed_items nested table.

FETCH_CLOB comes in both function and procedure variants. The procedure variant returns the object by reference in an IN OUT NOCOPY parameter. This is currently faster than the function variants where LOBs are returned by value, a practice that involves an expensive LOB copy. In other embodiments, functions may return LOBs by reference, rendering the procedure variant unnecessary.

All LOBs returned by FETCH_xxx are temporary LOBs with CALL duration. If FETCH_xxx is invoked by a client program via the Oracle Call Interface (OCI), output LOBs are converted to SESSION duration before being transmitted to the client. It is the client program's responsibility to free the LOB. The same applies to the XMLType object.

In a preferred embodiment, it is expected that the same variant of FETCH_xxx will be called for all objects selected by OPEN, i.e., that clients will not intermix calls to FETCH_XML, FETCH_DDL and FETCH_CLOB using the same OPEN handle. The effect of calling different variants is undefined.

The metadata fetched for each object in a preferred embodiment is internally consistent with respect to on-going DDL (and the subsequent recursive DML) operations against dictionary 106. In some cases multiple queries may be issued for performance reasons (e.g., one query for heap tables, one for index-organized tables, etc.) Consequently the metadata returned by FETCH_xxx calls may in fact include information fetched from different underlying cursors and read consistency therefore cannot be guaranteed.

DBMS_METADATA.CLOSE( )

PROCEDURE close (handle IN NUMBER);

Parameters handle—the handle returned from OPEN.

Exceptions

| Exception | Description |
|---|---|
| INVALID_ARGVAL | The value for the handle parameter is NULL or invalid. |

Usage

This procedure invalidates the handle returned by OPEN and cleans up associated state. The caller may thereby prematurely terminate the stream of objects established by OPEN.

If a call to FETCH_xxx returns NULL indicating that there are no more objects for which metadata will be returned, a call to CLOSE will transparently be made on the caller's behalf. In this case, the caller may still call CLOSE on the handle and not get an exception. (The call to CLOSE is not required but it is safe.)

In the case where the caller knows that only one specific object is to be returned, the caller should explicitly call CLOSE after the single FETCH_xxx call to free up the resources held by the handle.

Simplified Interfaces Provided by API 120

In addition to the procedures and functions just described, API 120 provides two simplified interfaces for use in browsing metadata information for an object and for creating a new object from an XML description of its metadata. The first of these interfaces is the group of functions denominated get_xxx:

DBMS_METADATA.GET_xxx( )

| FUNCTION get_xml ( | object_type | IN VARCHAR2, |
|---|---|---|
| | name | IN VARCHAR2, |
| | schema | IN VARCHAR2 DEFAULT NULL, |
| | version | IN VARCHAR2 DEFAULT 'COMPATIBLE', |
| | model | IN VARCHAR2 DEFAULT 'ORACLE', |
| | transform | IN VARCHAR2 DEFAULT NULL) |
| | RETURN CLOB; | |
| FUNCTION get_ddl ( | object_type | IN VARCHAR2, |
| | name | IN VARCHAR2, |
| | schema | IN VARCHAR2 DEFAULT NULL, |

-continued

| | | |
|---|---|---|
| | version | IN VARCHAR2 DEFAULT 'COMPATIBLE', |
| | model | IN VARCHAR2 DEFAULT 'ORACLE', |
| | transform | IN VARCHAR2 DEFAULT 'DDL') |
| | RETURN CLOB; | |

Parameters object_type—the class of object to be retrieved. This parameter takes the same values as the OPEN object_type parameter, above. In addition the following types may be specified:

PACKAGE_SPEC—package specification (without body)

PACKAGE_BODY—package body

TYPE_SPEC—type specification (without body)

TYPE_BODY—type body name—an object name (case-sensitive).

schema—a schema name (case-sensitive). The default is (a) the current schema if object_type refers to a schema object, (b) NULL otherwise.

version—the version of metadata to be extracted. This parameter takes the same values as the OPEN version parameter, above.

model—The metadata model to use. This parameter takes the same values as the OPEN model parameter, above.

transform—the name of a transformation on the output. This parameter takes the same values as the ADD_TRANSFORM name parameter, above. For GET_XML this must not be "DDL."

Returns the metadata for the object as XML or DDL.

Exceptions

| Exception | Description |
|---|---|
| INVALID_ARGVAL | A NULL or invalid value was supplied for an input parameter. The error message text identifies the parameter. |
| OBJECT_NOT_FOUND | The specified object was not found in the database. |

Usage

This function provides a simple way to return the metadata for a single object. Conceptually each GET_xxx call comprises an OPEN, one or two SET_FILTER calls, optionally an ADD_TRANSFORM, a FETCH_xxx and a CLOSE. The object type parameter has the same semantics as in OPEN. schema and name are used for filtering. If a transform is specified, schema-level transform flags are inherited. These functions can't retrieve metadata for objects that do not have unique names. The GET_DDL function defines an enumerated constant SESSION_TRANSFORM as the handle of the "DDL" transform at the session level. The user can call SET_TRANSFORM_PARAM using SESSION_TRANSFORM to set transform parameters for the whole session. GET_DDL inherits these parameters when it invokes the "DDL" transform. Note that in the preferred embodiment, the enumerated constant must be prefixed with the package name for API 120, i.e., DBMS_METADATA.SESSION_TRANSFORM

EXAMPLES

Example 1

Fetch the XML representation of the table definition SCOTT.EMP:

SELECT DBMS_METADATA.GET_XML ('TABLE', 'EMP','SCOTT') FROM DUAL;

Example 2

Fetch the DDL for all "complete" tables in the current schema, filtering out nested tables and overflow segments. Use SET_TRANSFORM_PARAM (with the handle value=DBMS_METADATA.SESSION_TRANSFORM meaning "for the current session") to specify that storage clauses are not to be returned in the SQL DDL. Afterwards, reset the session-level parameters to their defaults.

execute DBMS_METADATA.SET_TRANSFORM_
     PARAM(DBMS_METADATA.SESSION_
     TRANSFORM, 'STORAGE',false);
   SELECT DBMS_METADATA.GET_DDL('TABLE',
     u.table_name)
     FROM USER_ALL TABLES u
     WHERE u.nested='NO'
     AND (u.iot_type is null or
       u.iot_type='IOT');
   execute DBMS_METADATA.SET_TRANSFORM_
     PARAM(DBMS_METADATA.SESSION_
     TRANSFORM,'DEFAULT');

SUBMIT function

Some embodiments of API 120 may include a SUBMIT function that takes as its input XML that describes the metadata for an object 105 and creates the object from the input XML. In most cases, of course, the input XML is obtained using API 120.
DBMS_METADATA.SUBMIT( )

| FUNCTION submit ( | document | IN XMLType, |
| | object_type | IN VARCHAR2, |
| | operation | IN VARCHAR2, |
| | model | IN VARCHAR2 DEFAULT ORACLE', |
| | transform | IN VARCHAR2 DEFAULT 'DDL') |
| | RETURN sys.ku$_SubmitErrors; | |

See 811 and 813 in FIG. 8 for the specification of sys.ku$_SubmitErrors.

Parameters document—the XML document to be submitted.
object_Type—the type of object represented by the document. This parameter takes the same values as the OPEN object_type parameter, above.
operation—the DDL operation to be performed. Valid values are 'CREATE', 'DROP', 'GRANT' and 'REVOKE'.
model—the metadata view for the document. This parameter takes the same values as the OPEN model parameter, above.
transform—the SUBMIT function converts the XML document to DDL before submitting it to the database. The transform parameter designates the XSL script to perform the transformation. This parameter takes the same values as the ADD_TRANSFORM name parameter, above.

Returns a table of error information if any errors occur, otherwise NULL. Each entry in the table includes the SQL statement that was being processed when the error occurred and the errorNumber and errorString returned by Oracle.

Exceptions

| Exception | Description |
| --- | --- |
| INVALID_ARGVAL | A NULL or invalid value was supplied for an input parameter. The error message text identifies the parameter. |

Usage

This function performs the specified XSL transform to convert the XML document to a CREATE, DROP, GRANT or REVOKE DDL command and then submits the DDL to the database.

Details of Aggregation Metadata: FIGS. 9–15

As described above, API 120 retrieves metadata for objects belonging to particular object classes, with the class of object being specified in the open function called by a client to begin interaction with API 120. Each UDT, object view, and filter spec in aggregation metadata 109 must therefore be associated with an object class. In embodiments in which API 120 retrieves metadata for a variety of different metadata models, objects in aggregation metadata 109 are associated with a model as well as a class. In a preferred embodiment, this is done by means of five tables in aggregation metadata 109. The tables are the following. Their definitions are shown in detail in FIG. 9.

SYS.METAVIEW$ 901: This table is used by API 120 to determine which UDT 110 and view 111 to use for a given client's request. Each row specifies a mapping between a unique object_type 903, model 905, version 906 tuple and a row in SYS.METAVIEW$, and the row specifies a UDT/view combination for the object class, metadata model, and metadata version specified by fields 903, 905, and 906. The API finds the row where object_type/ model/version=the client-specified values for those parameters and issues a query against the UDT/view combination identified at 909 and 911. xmltag 907 becomes the tag for the object in the returned XML document. Each model supported by API 120 has its own set of UDTs and object views.

SYS.METAFILTER$ 913: Each row in this table specifies a mapping between a filter name 915 (used in the SET_FILTER name parameter) and the name 919 of its corresponding attribute in a UDT. This allows the caller to use user-friendly names like "NAME" and "SCHEMA" for filtering parameters, and hides the details of how those parameters are encoded in the UDT. At 917, the table row specifies the filter's properties.

SYS.METAXSL$ 921: This table stores URI (universal resource indicator) locators 925 for XSL transformation scripts 115. There is a row in table 921 for each xmltag 907, transform 923, and model 905 tuple. xml tag 907 relates rows in sys.metaxsl$ to classes of objects in data dictionary 106, and there may be multiple transforms associated with a class of objects; e.g, an object of class TABLE object may have XSL scripts for making both creation DDL and "create a snapshot" DDL. transform 923 designates the desired transform, e.g., "DDL." This approach allows the caller of OPEN to use user-friendly names like "DDL" to refer to a class of scripts, i.e., the XSL script (whatever it is and wherever it's located) that convert this object's XML to DDL.

SYS.METAXSLPARAM$ 927: This table stores the legal transform parameters and their default values for transforms defined in SYS.METAXSL$ 921. There is a row for each model 929, transform 931, type (class) 903, param 933 tuple.

SYS.METASTYLESHEET 935: This table stores the actual XSL transformation scripts for transforms defined in SYS.METAXSL$ 921. There is a row for each model 939 and stylesheet name 937 parameter, and the row contains the stylesheet itself at 941.

An Example UDT 110: FIG. 10

FIG. 10 shows an example UDT 1001 for TABLE objects. An object of UDT ku$_table_t 1001 holds the metadata returned by query 119 for an object of class TABLE. XML generator 125 converts the contents of this object into an XML document containing the metadata for the object. As can be seen from FIG. 10, object 121 collects an immense amount of information from data dictionary about the TABLE object. The following fields defined in UDT 1001 are of particular interest to the present discussion:

Fields defined in FIG. 10A:
db_version 1002, which contains the version of DBMS 103 that contains the TABLE object;
version numbers 1003 for user-defined data type 1001; As will be explained in more detail, these are used to make sure that UDT 1001 is compatible with the data base it is being used with;
obj# 1005, which is the identifier for the TABLE object in the data base system;
schema_obj 1007, which has the UDT ku$_schemaobj_t. Objects of this class aggregate information common to objects which reside in schemas; the aggregated information includes the object's name, owner, creation date, and object number;
storage 1009, which has the UDT ku$storage_t. Objects of this class aggregate information about an object's storage; here it is storage for the TABLE object;
Fields defined in FIG. 10B:
col_list 1013, a list of the columns defined for the current TABLE object;
con_list 1015, a list of the constraints defined for the current TABLE object;
part_obj 1017, a list of the partitions defined for the current TABLE object if the table is partitioned.

Much of this information comes from the table tab$ in system tables 107 in the Oracle 8 server; there is a row in tab$ for each TABLE object in DBMS 103.

The other UDTs that appear in UDT 1001 are the following. Objects with these UDTs receive information from tables in system tables 107; For each of the UDTs, the system table from which objects having the UDT receive information appears in italics. These system tables are the ultimate containers of the information that will be copied into the relevant fields of an object that has UDT 1001 as its type.

ku$_schemaobj_t: UDT for information common to schema-based objects; based on *obj$*
ku$_storage_t: UDT for storage characteristics of objects; based on *seg$*
ku$_column_t: UDT for colums; based on *col$*
ku$_column_list_t: UDT for a list of columns defined as a nested table of ku$_column_t
ku$_constraint_t: UDT for table constraints; based on *con$* and *cdef$*
ku$_constraint_list_t: UDT for a list of columns; defined as a nested table of ku$_constraint_t
ku$_part_obj_t: UDT for partitioned objects; based on *partobj$*

Details of an Aggregation Object View 110 that Retrieves Data for the Fields of an Object Having UDT 1001: FIG. 11

FIG. 11 shows the definition of aggregation object view 1101 in a preferred embodiment. Aggregation object view 1101 is an object view which defines a table whose rows are aggregation objects of UDT 1001 for the TABLE class. When a fetch function or procedure runs query 119 as modified by SET_FILTER over aggregation object view 1101, API 120 returns the objects specified by query 119 as specified in the SET_COUNT procedure. Each returned object contains the metadata needed to describe a particular object of the TABLE class. The returned object goes to XML generator 125, which generates XML from it. The XML may in turn be modified in XML transformer 127 in accordance with one or more transforms specified in ADD_TRANSFORM.

The portion of FIG. 11 labeled 1102 specifies that the view ku$_table_view 1101 is a view each of whose rows contain an object 121 that has the UDT ku$_table_t. Each row in ku$_table_view must have a primary key, and the OID function in 1102 specifies that the primary key will be the value of the field obj_num 1005 in ku$_table_t 1001. The select . . . from clause (1103, 1115) indicates what data is being aggregated by the view and how that data will be mapped onto fields in an object of UDT ku$_table_t 1001. from portion 1115 of the select . . . from clause specifies the tables from which ku$_table_view 1101 obtains most of its information; as will be seen later, some of the information from the tables in the from clause is used to obtain information from other tables. There are three such tables: the system table tab$, represented by t in ku$_table_view 1101, and two other aggregation object views, ku$_schemaobj_view, represented by o in view 1101, and ku$_storage_view, represented by s.

where clause 1116 indicates the conditions under which a row of view 1101 will contain information from rows of the tables in the from clause. The (+) operator is an outer join operator; it states that there will be a row in view 1101 corresponding to a row of the table on the left-hand side of the (+) operator even if there is no corresponding row of the table on the right-hand side of the (+) operator; if there is a corresponding row, the row in view 1101 will contain fields from both rows. Thus, the where clause at 1115 states that there will be a row in view 1101 for every row in tab$ and the row will contain fields from ku$_schemaobj_view if there is a row in the latter view whose obj_num field belonging to the obj_num column has the same value as the value of the field belonging to the obj# column in the current row in tab$ (1117). The four lines labeled 1119 indicate that the row in view 1101 will also contain fields from ku$_storage_view if the system seg$ table underlying ku$_storage_view has a row for the table specified by the current row in tab$.

The lines labeled 1121, finally, are a security clause that ensures that when API 120 is being used by a non-privileged client, it will return metadata only for those objects which belong to the user. It specifies that the user ID (UID) of the client invoking API 120 must be that of the owner of the object that is represented by the row in tab$ or the UID is 0, which is the system user ID, or the client has the SELECT_CATALOG_ROLE, which permits the client to read the entire data dictionary.

Continuing with the select portion 1103 of object view 1101, the values specified in portion 1103 correspond to field names in UDT 1001 by order; thus, the constants at 1104 in object view 1101 correspond to and are the values for the fields db_version, major_version, and minor_version in UDT 1001. The values at 1105, which are the object number of t, the schema object, and the storage object, similarly go into fields 1005, 1007, and 1009 of the ku$_table_t object.

Getting the value for ts_name field 1011 is a bit more complicated; it comes from another view, ku$tablespace_view, and as specified in the where clause, it is located in that view by means of the value of t.ts#. At 1109, the values for the portion of the ku$_table_t object labeled 1107 are set forth; they are all from fields of t.

The remainder of select clause 1103 is devoted to obtaining values for the three fields col_list 1013, con_list 1015, and part_obj 1017. The value of each of these fields is an object of a UDT whose contents come from another aggregate view 111; thus, col_list has the UDT ku$_column_list_t and as indicated at 111, the values are to be selected from a view ku$_column view where the object number in the view is the same as the object number in t. In order to give the values from ku$_column_view the proper UDT for col_list, ku$_table_view does a cast, that is, it arranges the values as required for the UDT ku$_column_list_t. The cast is necessary here because ku$_column_list_t is a nested table of column objects. It is necessary for the same reason with regard to the value obtained at 1113 for con_list 1015. The value of part_obj 1017, on the other hand, has the UDT ku$_part_obj_t, which is not a nested table, so no cast is necessary.

Details of Aggregation Metadata 109 and its Relationship to Tables in System Tables 107: FIG. 15

FIG. 15 shows details of how the table, view, and UDT objects in aggregation metadata 109 relate to each other and to tables in system tables 107. As explained above, metaview$ 901 associates an object class, metadata model, metadata version tuple with a UDT and object view for that class; shown at 1509 are the UDT 1001 and the object view 1101 for the TABLE class of objects; as further shown by the arrows connecting box 1509 with tables in system tables 107, object view 1101 loads the fields of objects of UDT 1001 with metadata obtained from the tab$, obj$, seg$, col$, con$, cdef$, and partobj$ system tables, and thus aggregates the metadata for a table object into a single object of UDT 1001.

Each row in metaview$ 901 may be associated with one or more rows in metaxsl$ 921. Each row in metaxsl$ represents one transform for a metadata model and includes both the name of the transform and the location of the row containing the XSL for the transform in metastylesheet 935. Each row in metaxsl$ 921 is further associated with one or more rows in metaxslparams 925, each row of which specifies a parameter for an XSL style sheet specified by a metadata model, transform name, and object type tuple. metafilter$ 913, finally, associates an object class and metadata model with a named filter.

Notes on the implementation of UDTs and TableViews for the TABLE class

While ku$_table_t 1001 and ku$_table_view 1101 show how data aggregation works in a preferred embodiment, they are merely exemplary. The actual implementation of the UDTs and object views that aggregate metadata for TABLE objects in the preferred embodiment is substantially more complicated. Tables are the most complex objects with respect to their metadata; i.e, one could have a sub-partitioned, index-organized table with LOB, UDT, nested-table columns, etc. However, the vast majority of tables defined by users of DBMS 103 are relational tables with simple scalar columns. Gathering up all the metadata for the complex case is performance intensive, so the implementation defines a number of mutually exclusive object views that add increasing complexity. The UDTs used to aggregate the metadata of the vast majority of table objects are found in the first and simplest object view, so performance for the common path is good. Here are the table views that the current implementation defines for the TABLE class of objects:

- ku$_htable_view—heap-organized relational tables: No IOTs, LOB, object, nested-table columns, no partitions
- ku$_phtable_view—Same as above, but can be partitioned.
- ku$_fhtable_view—heap-organized with no column type restrictions: can have LOB, object, nest-table cols, no IOTs
- ku$_pfhtable_view—Same as above, but can be partitioned.
- ku$_iotable_view—Index-Organized tables (IOTs): no column restricitions: no partitions
- ku$_piotable_view—Same as above, but can be partitioned.

For a particular set of filters, the mdAPI knows which view(s) must be queried to cover the full potential set of objects to be returned.

An Example of Operation of System 101: FIGS. 12–14

The following example will show how system 101 uses UDT 1001 and view 1101 for TABLE objects to retrieve information about a table named SCOTT.BONUS, expresses the information as an XML document, and uses an XSL script to transform the XML document into creation DDL for the table. FIG. 12 shows the creation DDL for SCOTT.BONUS. DDL 1201 consists of a single CREATE statement 1201; statement 1201 has two parts: at 1203 is seen a logical specification of the table; at 1211 is seen a specification of a set of attributes that specify how DBMS system 103 is to set up the table. Logical specification 1207 indicates that the table has four columns. There is a row in the table for each employee; in a row, the field in the first column of SCOTT.BONUS, named ENAME, is the employee's name, the field in the second column, JOB, is for the employee's job code; the field in the third column, SAL, is for the employee's salary; the field in the fourth column, COMM, is for the employee's commission. As can be seen at 1209, for each column, the data type of the value in the column's fields is specified.

When the information in creation DDL 1201 is compared with the fields in ku$_table_t definition 1001, it is seen that the information in the definitions of the columns at 1207 corresponds to the field col_list 1013 of ku$_table_t, that the information at 1213 in DDL definition 1201 corresponds to the fields pct_free, pct_used, initrans, and maxtrans in 1012, that the information at 1213 corresponds to the field storage 1009, and that the information at 1217 corresponds to ts_name 1011. In the preferred embodiment, the view ku$_table_view 1101 is used to collect this and other information about the table SCOTT.BONUS from data dictionary 106.

FIG. 13 shows a portion 1301 of the XML document which XML generator 125 makes from the UDT ku$_table_t object which contains the information about SCOTT.BONUS. Any XML document made from a ku$_table_t object will resemble XML document 1301, differing only as determined by differences in the information in the ku$_table_t object. Turning to FIG. 13, XML employs nested constructs. Each construct has the form <construct_name> construct_content </construct_name> where construct_content may include other constructs. Thus, in document 1301, the outermost construct is <TABLE_T> ... </TABLE_T> 1303. Within construct 1303 are constructs corresponding to the fields of the ku$_table_t object that have values; the contents of the construct is the value of the field in SCOTT.BONUS. In FIG. 13, the constructs have been labeled with reference numbers in parentheses indicating the corresponding fields in ku$_table_t Thus, <DB_VERSION> ... </DB_VERSION> construct (1002) contains the value of field 1002 of ku$_table_t.

Where a field has a user-defined type in ku$_table_t, all of the fields of the user-defined type appear in the structure in XML 1301 corresponding to the field; thus the <SCHEMA_OBJ> ... </SCHEMA_OBJ> construct corresponding to schema_obj field 1007, which has the UDT ku$_schemaobj_t has nested in it constructs corresponding to the fields of the UDT ku$_schemaobj_t, and the same is the case with the XML constructs corresponding to storage 1009 and to COL_LIST 1013. Since COL_LIST'sUDT ku$_column_list_t is defined as a nested table of objects that have the UDT ku$_column_t and that represent columns in the table SCOTT.BONUS, there is nested in <COL_LIST> ... </COL_LIST> a structure <COL_LIST_ITEM> ... </COL_LIST_ITEM> for every column in that table; in FIG. 13B, only the structure 1305 for the first column is shown.

FIG. 14 shows a portion 1401 of the XSL-T stylesheet which transforms the <COL_LIST> ... </COL_LIST> XML structure made from the ku$_table_t object containing the metadata for SCOTT.BONUS into column definition 1207 in the CREATE DDL for SCOTT.BONUS. Like XML, XSL is made up of nested constructs, with the beginning of a construct being marked by <construct_name> and the end being marked by </construct_name>. The constructs specify actions to be performed on constructs from the XML document being transformed, in this case the XML construct <COL_LIST> ... </COL_LIST> and the XML constructs nested therein.

At 1403 is seen the beginning and end of an XSL template construct that processes <COL_LIST> ... </COL_LIST>. The first nested construct, at 1405, is a text construct that simply outputs the text it contains, in this case, "(", the left parenthesis for column list 1207 in CREATE DDL 1201. The next nested construct, for-each, at 1407, is a loop which processes each COL_LIST_ITEM in the XML in turn. At 1409, the COL_LIST_ITEMs are sorted by the value of the XML COL_NUM item; then at 1411, the "that precedes the column name in the DDL is output, followed by the value of the XML NAME construct, which is the name of the column, and the " that follows the column name.

At 1415, a variable that indicates the class of object for which the DDL is being generated is tested; as indicated at 1417, if the object has the class TABLE, the processing continues at the template for the XML TYPE_NUM construct. The beginning and end of the template have the reference number 1421. At 1423, what is done depends on the value in the XML TYPE_NUM construct, which is 1 for the first column. The value 1 indicates that the column has the VARCHAR2 data type, so that keyword is inserted into the DDL, as shown at 1425. At 1427, processing is transferred to a template 1429 for either the XML PRECISION_NUM construct or the XML LENGTH construct. The latter construct contains the value that specifies the length of the VARCHAR2 data item, here 10 characters. Template 1429 is found at the bottom of FIG. 14B. At 1431, the left parenthesis for the length expression is output; at 1433, the value of the LENGTH construct itself is output; at 1435, the right parenthesis. When template 1429 is completely executed, processing is transferred back to template 1421, which also finishes execution, transferring control back to template 1403, which outputs the comma following the length specifier and thereby finishing the first column specification in 1207, namely "ENAME" VARCHAR2 (10),. Template 1421 then processes the other three columns, with processing being performed generally as just described. When all of the columns have been processed, template 1421 outputs the right parenthesis for column definition 1207 at 1439. XSL-T scripts are used in generally the same fashion to transform constructs from XML document 1301 into the rest of CREATE DDL 1201. For example, the part of CREATE 1201 labeled 1213 is transformed from the portion of XML document 1301 labeled (1012), the part labeled 1215 is transformed from the portion of XML document 1301 labeled (1009), and the part labeled 1217 is transformed from portion (1011) of XML document 1301.

As can be seen from the foregoing, system 101 can handle any kind of metadata. User-defined types and object views provide a completely general mechanism for reading metadata from objects in any repository of metadata, an XML document can be generated from the contents of any object that contains metadata, and an XSL stylesheet can be made which will transform the XML document into any form that is desired. Where a transform is particularly useful, as is the transform to creation DDL, it may be provided as part of system 101 and system 101 may provide the client with the output of the transform; otherwise, system 101 will provide the XML document and the client can apply any transform it wishes to the XML document. Moreover, as previously pointed out, the principles employed in the design and implementation of API 120 may be employed not only to aggregate metadata, but to aggregate any class of information that is stored in a number of objects in a database system.

Conclusion

The foregoing Detailed Description has disclosed to those skilled in the arts to which the invention pertains how to make and use an application program interface that simplifies the collection of data that is stored in a plurality of objects and has showed how the application program interface may be used to collect metadata for objects belonging to a particular class of objects from the data dictionary of a database system, to generate an intermediate representation of the metadata, and to transform the intermediate representation. The Detailed Description has further disclosed the best mode presently known to the inventors for making such an application program interface.

As will be immediately apparent to those skilled in the arts to which the invention pertains, there are many ways of implementing an application programming interface that incorporates the principles of the present invention. For instance, many of the details of the implementation disclosed in the Detailed Description are artifacts of the fact that the implementation is designed for use in an Oracle9i server. The invention may, however, be implemented in other database systems, and the details of such implementations will reflect the peculiarities of the database systems in which they are implemented. Many other details of the disclosed implementation further reflect the fact that the disclosed implementation is used to retrieve and transform metadata from a data dictionary. The invention is, however, by no means limited to such an application, but its principles can be applied wherever there is a need to retrieve information that is contained in a number of different base tables of the database system. The use of XML as an intermediate form for the retrieved information and of XSL style sheets to transform the retrieved information into a desired form is particularly advantageous, but other embodiments may employ other intermediate forms and/or other transformation techniques.

The open-fetch-close paradigm used for the API in the present implementation is also particularly advantageous, but the API may employ other paradigms, as is shown by the browsing interface of the present application. Different APIs may further not provide filtering capabilities or transforming capabilities or may provide filtering and transforming capabilities that are different from the ones disclosed herein.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for retrieving metadata for an object in a database system that has a data dictionary, the metadata for the object being stored in a plurality of objects belonging to the data dictionary and the apparatus comprising:
   a definition in the data dictionary for an aggregation object that aggregates the metadata for the object from the plurality of objects belonging to the data dictionary; and
   an application program interface that includes a fetch interface that causes execution of a query which returns the metadata for the object in an aggregation object made according to the definition.

2. The apparatus set forth in claim 1 wherein:
each object in the database system has a class; and
the definition for the aggregation object is associated with a given one of the classes and aggregates the metadata for any object belonging to the class.

3. The apparatus set forth in claim 2 wherein:
the application program interface further includes an open interface which specifies the given class and causes the fetch interface to execute a query which fetches the metadata for an object of the specified class.

4. The apparatus set forth in claim 3 wherein:
the application program interface further includes a filter interface that specifies a set of objects of the given class and causes the fetch interface to execute a query that fetches metadata for the specified set of objects.

5. The apparatus set forth in claim 4 wherein:
the application program interface further includes a count interface that causes the fetch interface to returns metadata for a number of objects in the set as specified by the count interface.

6. The apparatus set forth in claim 4 wherein:
the data dictionary includes a filter specifier object;
the filter interface specifies a filter from the filter specifier object; and
the fetch interface employs the specified filter in fetching the set of objects.

7. The apparatus set forth in claim 1 wherein:
the fetch interface causes an intermediate form to be generated from the returned metadata.

8. The apparatus set forth in claim 7 wherein:
the application program interface further includes a transform interface which specifies a transform of the intermediate form and causes the fetch interface to transform the intermediate form as specified by the transform interface.

9. The apparatus set forth in claim 8 wherein:
the data dictionary further includes a transform object that specifies the transform;
the transform interface specifies a transform from the transform object; and
the fetch interface employs the specified transform in fetching the set of objects.

10. The apparatus set forth in claim 9 wherein:
the application program interface further includes a transform parameter interface which specifies a parameter for a specified transform and causes the fetch interface to transform the intermediate form as specified by the parameter for the specified transform.

11. The apparatus set forth in claim 10 wherein:
the data dictionary includes a transform parameter object;
the filter interface specifies a transform parameter from the transform parameter object; and
the fetch interface employs the specified transform parameter in transforming the intermediate form.

12. The apparatus set forth in claim 8 wherein:
the intermediate form is an XML document; and
the transform is an XSL-T stylesheet for the XML document.

13. The apparatus set forth in claim 1 wherein:
the fetch interface causes a definition for the object that permits creation thereof by a particular database system to be generated from the returned metadata.

14. The apparatus set forth in claim 13 wherein:
the generated definition is creation DDL for the object.

15. The apparatus set forth in claim 1 wherein the apparatus further comprises:
an object view associated with the aggregation object definition; and
the query is a query over the object view.

16. Data storage apparatus, the data storage apparatus being characterized in that:

the data storage apparatus contains code which, when executed by a processor, implements the apparatus set forth in claim 1.

17. Apparatus for retrieving metadata for a set of objects in a database system, each object in the database system belonging to a class of a plurality thereof including an object view class and a user-defined type class, the database system having a data dictionary wherein the metadata for objects of a given class is stored in a plurality of objects, and the objects in the set of objects all having the same class, the apparatus comprising:

a plurality of aggregation user-defined types, each aggregation user-defined type of the plurality being associated with a given class and defining an aggregation object into which is aggregated metadata for an object having the given class from the plurality of objects wherein the metadata is stored;

a plurality of aggregation object views, each aggregation object view of the plurality being associated with a given class; and an application program interface that includes a fetch interface that causes execution of a query over an aggregation object view associated with a particular class, the query returning a set of aggregation objects of the aggregation user-defined type associated with the particular class and each aggregation object containing metadata for an object in a set of objects belonging to the particular class.

18. The apparatus set forth in claim 17 wherein:

the application program interface further includes an open interface which specifies the particular class.

19. The apparatus set forth in claim 17 wherein:

the application program interface further includes a filter interface that specifies the set of objects of the particular class.

20. The apparatus set forth in claim 17 wherein:

the application program interface further includes a count interface that specifies a number of objects in the set for which the metadata is to be returned per call to the fetch interface.

21. The apparatus set forth in claim 17 wherein:

the application program interface generates an XML document from the metadata in the set of aggregation objects.

22. The apparatus set forth in claim 21 wherein:

the application program interface further includes a transform interface which specifies an XSL-T stylesheet that transforms the XML document and the application program interface transforms the XML document as specified by the XSL-T stylesheet.

23. The apparatus set forth in claim 22 wherein:

the application program interface further includes a transform parameter interface which specifies a parameter for the specified XSL-T stylesheet.

24. The apparatus set forth in claim 17 wherein:

the application program interface further produces creation DDL for an object in the set of objects from the metadata for that object.

25. Data storage apparatus, the data storage apparatus being characterized in that the data storage apparatus contains code which, when executed by a processor, implements the apparatus set forth in claim 17.

26. Apparatus for aggregating data stored in a plurality of objects in a database system, the database system being of a type that permits definition of user-defined types, of objects in the database having the user-defined types, and of object views associated with the user-defined types, an object view mapping data stored in the database into an object of the associated user-defined type, and the apparatus comprising:

a user-defined type associated with a kind of data to be aggregated that defines an object for containing aggregated data of the kind;

an object view associated with the kind of data to be aggregated that specifies the locations of the data to be aggregated in the plurality of objects; and an application program interface that includes a fetch interface that causes the database system to make a query over the object view associated with the kind that obtains the data to be aggregated from the plurality of objects and returns an object of the user-defined type associated with the kind that contains the aggregated data.

27. The apparatus set forth in claim 26 wherein:

there is a plurality of instances of the aggregated data to be aggregated in the plurality of objects; and the application program interface further includes a filter interface associated with the kind of aggregated data that specifies a set of the instances of the data to be aggregated and that causes the fetch interface to fetch the instances belonging to the set.

28. The apparatus set forth in claim 27 wherein:

the application program interface further includes a count interface that causes the fetch interface to return per call to the fetch interface a number of instances of the objects of the user-defined type associated with the kind as specified by the count interface.

29. The apparatus set forth in claim 26 wherein:

the fetch interface causes an intermediate form to be generated from the returned aggregated data.

30. The apparatus set forth in claim 29 wherein:

the application program interface further includes a transform interface which specifies a transform of the intermediate form and causes the fetch interface to transform the intermediate form as specified by the transform interface.

31. The apparatus set forth in claim 30 wherein:

the intermediate form is an XML document; and the transform is an XSL-T stylesheet for the XML document.

32. The apparatus set forth in claim 26 wherein:

there are a plurality of kinds of aggregated data;

a given kind of aggregated data is associated with a name;

the user-defined type and the object view for the given kind are associated with the name therefor; and the fetch interface responds to the name by causing the data base system to make the query over the object view associated with the name and return an object of the user-defined type associated with the name.

33. Data storage apparatus, the data storage apparatus being characterized in that: the data storage apparatus contains code which when executed be a processor, implements the apparatus set forth in claim 26.

34. A method of retrieving metadata for a target object in a database system that has a data dictionary, the metadata for the target object being stored in a plurality of objects belonging to the data dictionary, the data dictionary including a definition for an aggregation object that aggregates the metadata for the target object from the plurality of objects belonging to the data dictionary, and the method comprising the steps of:
invoking a fetch operation via an application program interface wherein the invocation is associated with the target object; and
during the fetch operation, executing a query which returns the metadata for the target object in an aggregation object made according to the definition.

35. The method set forth in claim 34 wherein:
each object in the database system has a class;
the definition for the aggregation object is associated with a given one of the classes and aggregates the metadata for any object belonging to the class;
in the step of invoking the fetch operation, the invocation is associated with the target object via the target object's class; and
in the step of executing the query, the query returns the metadata in an aggregation object associated with the target object's class.

36. The method set forth in claim 35 further comprising the step of:
prior to the step of invoking the fetch operation, invoking an open operation via the application program interface, the open operation specifying the target object's class.

37. The method set forth in claim 34 further comprising the step of:
prior to the step of invoking the fetch operation, invoking a filter operation via the application program interface, the filter operation specifying a filter for the query that returns the metadata.

38. The method set forth in claim 34 further comprising the steps of:
prior to the step of invoking the fetch operation, invoking a transform operation via the application program interface, the transform operation specifying a transform for the metadata in the aggregation object and
following the step of executing the query, using the specified transform to transform the metadata in the aggregation object.

39. The method set forth in claim 38 wherein:
the specified transform transforms the metadata into creation DDL.

40. Data storage apparatus, the data storage apparatus being characterized in that the data storage apparatus contains code which, when executed by a processor, causes the processor to perform a method of retrieving metadata for a target object in a database system that has a data dictionary, the metadata for the target object being stored in a plurality of objects belonging to the data dictionary, the data dictionary including a definition for an aggregation object that aggregates the metadata for the target object from the plurality of objects belonging to the data dictionary, and
the method comprising the steps of:
invoking a fetch operation via an application program interface wherein the invocation is associated with the target object; and
during the fetch operation, executing a query which returns the metadata for the target object in an aggregation object made according to the definition.

41. A method of aggregating data stored in a plurality of objects in a database system, the database system being of a type that permits definition of user-defined types, of objects in the database having the user-defined types, and of object views associated with the user-defined types, an object view mapping data stored in the database into an object of the associated user-defined type, and the user-defined types including a user-defined type associated with a kind of data to be aggregated that defines an object for containing aggregated data of the kind and the object views including an object view associated with the kind of data to be aggregated that specifies the locations of the data to be aggregated in the plurality of objects,
the method comprising the steps of:
invoking a fetch operation via an application program interface wherein the invocation is associated with the user-defined type; and
during the fetch operation, executing a query over the object view associated with the user-defined type that obtains data to be aggregated from the plurality of objects and returns an object of the user-defined type that contains the aggregated data.

42. The method set forth in claim 41 wherein there is a plurality of instances of the data to be aggregated in the plurality of objects and the method further comprises the step of:
prior to the step of invoking the fetch operation, invoking a filter operation of the application program interface, the filter operation specifying a filter for the query.

43. The method set forth in claim 42 further comprising the step of:
prior to the step of invoking the fetch operation, invoking a count operation of the application program interface, the count operation specifying how many instances of the object of the user-defined type that contains the aggregated data are to be returned per invocation of the fetch operation.

44. The method set forth in claim 41 further comprising the step of:
prior to the step of invoking the fetch operation, invoking a transform operation of the application program interface, the transform operation specifying a transform of the intermediate form; and
following the step of executing the query, using the specified to transform to transform the aggregated data.

45. The method set forth in claim 44 wherein:
the specified transform transforms the aggregated data into an XML document.

46. Data storage apparatus, the data storage apparatus being characterized in that the data storage apparatus contains code which, when executed by a processor, causes the processor to perform a method of aggregating data stored in a plurality of objects in a database system, the database system being of a type that permits definition of user-defined types, of objects in the database having the user-defined types, and of object views associated with the user-defined types, an object view mapping data stored in the database into an object of the associated user-defined type, and the user-defined types including a user-defined type associated with a kind of data to be aggregated that defines an object for containing aggregated data of the kind and the object views including an object view associated with the kind of data to be aggregated that specifies the locations of the data to be aggregated in the plurality of objects,
the method comprising the steps of:
invoking a fetch operation via an application program interface wherein the invocation is associated with the user-defined type; and
during the fetch operation, executing a query over the object view associated with the user-defined type that obtains data to be aggregated from the plurality of objects and returns an object of the user-defined type that contains the aggregated data.

* * * * *